(12) United States Patent
Mathew et al.

(10) Patent No.: US 9,129,650 B2
(45) Date of Patent: Sep. 8, 2015

(54) ARRAY-READER BASED MAGNETIC RECORDING SYSTEMS WITH FREQUENCY DIVISION MULTIPLEXING

(71) Applicant: LSI Corporation, San Jose, CA (US)

(72) Inventors: George Mathew, San Jose, CA (US); Bruce Wilson, San Jose, CA (US); Suharli Tedja, San Ramon, CA (US); Eui Seok Hwang, Milpitas, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/021,811

(22) Filed: Sep. 9, 2013

(65) Prior Publication Data

US 2015/0029608 A1    Jan. 29, 2015

Related U.S. Application Data

(60) Provisional application No. 61/858,610, filed on Jul. 25, 2013.

(51) Int. Cl.
| | |
|---|---|
| G11B 20/06 | (2006.01) |
| G11B 5/09 | (2006.01) |
| G11B 5/035 | (2006.01) |
| G11B 5/02 | (2006.01) |
| G11B 20/10 | (2006.01) |

(52) U.S. Cl.
CPC .... *G11B 20/10268* (2013.01); *G11B 20/10046* (2013.01)

(58) Field of Classification Search
None
See application file for complete search history.

(56) References Cited

U.S. PATENT DOCUMENTS

| | | |
|---|---|---|
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,594,341 A | 1/1997 | Majidi-Ahy |
| 5,668,679 A | 9/1997 | Swearingen et al. |
| 5,696,639 A | 12/1997 | Spurbeck et al. |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

U.S. Appl. No. 13/529,572, filed Jun. 21, 2012, Yang et al.

(Continued)

*Primary Examiner* — Regina N Holder
(74) *Attorney, Agent, or Firm* — Hamilton DeSanctis & Cha

(57) ABSTRACT

A magnetic recording system includes an array of analog inputs operable to receive analog signals retrieved from a magnetic storage medium, a modulator operable to combine the analog signals to yield a frequency division multiplexed signal, a demodulator operable to yield a plurality of demodulated signals from the frequency division multiplexed signal corresponding to each channel of the array, and a joint equalizer operable to filter the plurality of demodulated signals to yield an equalized output.

20 Claims, 9 Drawing Sheets

(56) References Cited

U.S. PATENT DOCUMENTS

| | | | |
|---|---|---|---|
| 5,768,044 A | 6/1998 | Hetzler | |
| 5,781,129 A | 7/1998 | Schwartz et al. | |
| 5,798,885 A | 8/1998 | Saiki et al. | |
| 5,835,295 A | 11/1998 | Behrens | |
| 5,844,920 A | 12/1998 | Zook et al. | |
| 5,852,524 A | 12/1998 | Glover et al. | |
| 5,892,632 A | 4/1999 | Behrens | |
| 5,955,783 A | 9/1999 | Ben-Efraim | |
| 5,970,104 A | 10/1999 | Zhong et al. | |
| 5,986,830 A | 11/1999 | Hein | |
| 5,987,562 A | 11/1999 | Glover | |
| 6,005,742 A * | 12/1999 | Cunningham et al. | 360/78.05 |
| 6,009,549 A | 12/1999 | Bliss et al. | |
| 6,023,383 A | 2/2000 | Glover et al. | |
| 6,069,583 A | 5/2000 | Silverstrin et al. | |
| 6,081,397 A | 6/2000 | Belser | |
| 6,111,712 A | 8/2000 | Vishakhadatta et al. | |
| 6,208,478 B1 | 3/2001 | Chiu et al. | |
| 6,269,058 B1 | 7/2001 | Yamanoi et al. | |
| 6,278,591 B1 | 8/2001 | Chang | |
| 6,400,518 B1 | 6/2002 | Bhaumik et al. | |
| 6,404,829 B1 | 6/2002 | Sonu | |
| 6,411,452 B1 | 6/2002 | Cloke | |
| 6,441,661 B1 | 8/2002 | Aoki et al. | |
| 6,476,989 B1 | 11/2002 | Chainer | |
| 6,490,110 B2 | 12/2002 | Reed et al. | |
| 6,493,162 B1 | 12/2002 | Fredrickson | |
| 6,519,102 B1 | 2/2003 | Smith et al. | |
| 6,530,060 B1 | 3/2003 | Vis et al. | |
| 6,594,094 B2 * | 7/2003 | Rae et al. | 360/25 |
| 6,603,622 B1 | 8/2003 | Christiansen et al. | |
| 6,606,048 B1 | 8/2003 | Sutardja | |
| 6,633,447 B2 | 10/2003 | Franck et al. | |
| 6,646,822 B1 | 11/2003 | Tuttle et al. | |
| 6,657,802 B1 | 12/2003 | Ashley et al. | |
| 6,671,404 B1 | 12/2003 | Kawatani | |
| 6,717,764 B2 | 4/2004 | Lake | |
| 6,775,529 B1 | 8/2004 | Roo | |
| 6,788,484 B2 | 9/2004 | Honma | |
| 6,813,108 B2 | 11/2004 | Annampedu et al. | |
| 6,816,328 B2 | 11/2004 | Rae | |
| 6,839,014 B2 | 1/2005 | Uda | |
| 6,856,183 B2 | 2/2005 | Annampedu | |
| 6,865,040 B2 | 3/2005 | Fayeulle et al. | |
| 6,876,511 B2 | 4/2005 | Koyanagi | |
| 6,906,990 B2 | 6/2005 | Nagata et al. | |
| 6,912,099 B2 | 6/2005 | Annampedu et al. | |
| 6,963,521 B2 | 11/2005 | Hayashi | |
| 6,980,382 B2 | 12/2005 | Hirano et al. | |
| 6,999,257 B2 | 2/2006 | Takeo | |
| 6,999,264 B2 | 2/2006 | Ehrlich | |
| 6,999,404 B2 | 2/2006 | Furumiya et al. | |
| 7,002,767 B2 | 2/2006 | Annampedu et al. | |
| 7,016,131 B2 | 3/2006 | Liu et al. | |
| 7,038,875 B2 | 5/2006 | Lou et al. | |
| 7,054,088 B2 | 5/2006 | Yamazaki et al. | |
| 7,072,137 B2 | 7/2006 | Chiba | |
| 7,082,005 B2 | 7/2006 | Annampedu et al. | |
| 7,092,462 B2 | 8/2006 | Annampedu et al. | |
| 7,116,504 B1 | 10/2006 | Oberg | |
| 7,126,776 B1 | 10/2006 | Warren, Jr. et al. | |
| 7,133,227 B2 | 11/2006 | Chiang | |
| 7,136,250 B1 | 11/2006 | Wu et al. | |
| 7,154,689 B1 | 12/2006 | Shepherd et al. | |
| 7,158,464 B2 | 1/2007 | Gushima et al. | |
| 7,167,328 B2 | 1/2007 | Annampedu et al. | |
| 7,180,693 B2 | 2/2007 | Annampedu et al. | |
| 7,187,739 B2 | 3/2007 | Ma | |
| 7,191,382 B2 | 3/2007 | James et al. | |
| 7,193,544 B1 | 3/2007 | Fitelson et al. | |
| 7,193,798 B2 | 3/2007 | Byrd et al. | |
| 7,199,961 B1 | 4/2007 | Wu et al. | |
| 7,203,013 B1 | 4/2007 | Han et al. | |
| 7,203,015 B2 | 4/2007 | Sakai et al. | |
| 7,206,146 B2 | 4/2007 | Flynn et al. | |
| 7,663,831 B2 | 4/2007 | Sutardja et al. | |
| 7,230,789 B1 | 6/2007 | Brunnett et al. | |
| 7,248,425 B2 | 7/2007 | Byun et al. | |
| 7,253,984 B1 | 8/2007 | Patapoutian et al. | |
| 7,265,937 B1 | 9/2007 | Erden et al. | |
| 7,286,313 B2 | 10/2007 | Erden et al. | |
| 7,301,717 B1 | 11/2007 | Lee et al. | |
| 7,308,057 B1 | 12/2007 | Patapoutian | |
| 7,323,916 B1 | 1/2008 | Sidiropoulos et al. | |
| 7,349,493 B2 * | 3/2008 | Rudkin | 375/322 |
| 7,362,536 B1 | 4/2008 | Liu et al. | |
| 7,375,918 B1 | 5/2008 | Shepherd et al. | |
| 7,394,608 B2 | 7/2008 | Eleftheriou | |
| 7,411,531 B2 | 8/2008 | Aziz et al. | |
| 7,420,498 B2 | 9/2008 | Barrenscheen | |
| 7,423,827 B2 | 9/2008 | Neville | |
| 7,446,690 B2 | 11/2008 | Kao | |
| 7,525,460 B1 | 4/2009 | Liu et al. | |
| 7,529,320 B2 | 5/2009 | Byrne et al. | |
| 7,558,177 B2 | 7/2009 | Ogura et al. | |
| 7,602,567 B2 | 10/2009 | Park | |
| 7,602,568 B1 | 10/2009 | Katchmart | |
| 7,616,395 B2 | 11/2009 | Yamamoto | |
| 7,620,101 B1 | 11/2009 | Jenkins | |
| 7,630,155 B2 | 12/2009 | Maruyama et al. | |
| 7,643,235 B2 | 1/2010 | Erden et al. | |
| 7,656,982 B2 | 2/2010 | Gaedke | |
| 7,679,850 B2 | 3/2010 | Smith | |
| 7,693,243 B2 | 4/2010 | Chen et al. | |
| 7,738,200 B2 | 6/2010 | Annampedu | |
| 7,768,437 B2 | 8/2010 | Annampedu | |
| 7,768,730 B2 | 8/2010 | Bliss et al. | |
| 7,796,480 B2 | 9/2010 | Cheng et al. | |
| 7,813,065 B2 | 10/2010 | Annampedu | |
| 7,821,730 B2 | 10/2010 | Cao | |
| 7,835,104 B2 | 11/2010 | Yamashita | |
| 7,889,823 B2 | 2/2011 | Yang | |
| 7,929,237 B2 | 4/2011 | Grundvig | |
| 8,014,099 B2 | 9/2011 | Mathew | |
| 8,054,573 B2 | 11/2011 | Mathew | |
| 8,054,931 B2 | 11/2011 | Annampedu | |
| 8,059,349 B2 | 11/2011 | Annampedu | |
| 8,098,451 B2 | 1/2012 | Graef | |
| 8,102,960 B2 | 1/2012 | Ran et al. | |
| 8,107,573 B2 | 1/2012 | Chang | |
| 8,154,818 B2 | 4/2012 | Mathew | |
| 8,154,972 B2 | 4/2012 | Ratnakar Aravind | |
| 8,169,726 B2 | 5/2012 | Wilson | |
| 8,174,784 B2 | 5/2012 | Grundvig | |
| 8,174,949 B2 | 5/2012 | Ratnakar Aravind | |
| 8,237,597 B2 | 8/2012 | Liu | |
| 8,243,381 B2 | 8/2012 | Annampedu | |
| 8,254,049 B2 | 8/2012 | Annampedu | |
| 8,261,171 B2 | 9/2012 | Annampedu | |
| 2002/0150179 A1 | 10/2002 | Leis et al. | |
| 2005/0243455 A1 | 11/2005 | Annampedu | |
| 2007/0104300 A1 | 5/2007 | Esumi et al. | |
| 2008/0056403 A1 | 3/2008 | Wilson | |
| 2009/0142620 A1 | 6/2009 | Yamamoto et al. | |
| 2009/0274247 A1 | 11/2009 | Galbraith et al. | |
| 2010/0061490 A1 | 3/2010 | Noelder | |
| 2010/0067628 A1 | 3/2010 | Buehner | |
| 2010/0142078 A1 | 6/2010 | Annampedu | |
| 2011/0043938 A1 | 2/2011 | Mathew | |
| 2011/0157737 A1 | 6/2011 | Grundvig | |
| 2011/0209026 A1 | 8/2011 | Xia | |
| 2011/0228422 A1 * | 9/2011 | Buckholdt et al. | 360/75 |
| 2012/0036173 A1 | 2/2012 | Annampedu | |
| 2012/0084336 A1 | 4/2012 | Yang | |
| 2012/0087035 A1 | 4/2012 | Graef | |
| 2012/0106607 A1 | 5/2012 | Miladinovic | |
| 2012/0120784 A1 | 5/2012 | Yang | |
| 2012/0124241 A1 | 5/2012 | Yang | |
| 2012/0134042 A1 | 5/2012 | Annampedu | |
| 2012/0134043 A1 | 5/2012 | Annampedu | |
| 2012/0155587 A1 | 6/2012 | Annampedu | |
| 2012/0182643 A1 | 7/2012 | Zhang | |

(56) References Cited

U.S. PATENT DOCUMENTS

| | | |
|---|---|---|
| 2012/0236428 A1 | 9/2012 | Xia |
| 2013/0286502 A1 | 10/2013 | Erden et al. |
| 2014/0154991 A1* | 6/2014 | Brown et al. .................. 455/42 |

OTHER PUBLICATIONS

Annampedu, V. et al "Adaptive Algorithms for Asynchronous Detection of Coded Servo Signals Based on Interpolation", IEEE Transactions on Magnetics, vol. 41, No. 10, Oct. 2005.

Aziz et al., "Asynchronous Maximum Likelihood (ML) Detection of Servo Repeatable Run Out (RRO) Data", Digest, IEEE Intl Mag Conf, vol. 42, No. 10, pp. 2585-2587 (Oct. 2006).

Aziz et al., "Interpolation Based Maximum-Likelihood(ML) Detection of Asynchronous Servo Repeatable Run Out (RRO) Data" IEEE Intl Mag Conf. vol. 42 No. 10 pp. 2585-2587, Oct. 2006.

Hagenauer et al., "A Viterbi algorithm with soft-decision outputs and its applications," in Proc. IEEE Global Telecom Conf 1989, Dallas, Texas, pp. 1680-1686 (Nov. 1989).

Kryder, M. et al "Heat Assisted Magnetic Recording" Proc. IEEE, vol. 96, No. 11, p. 1810, Nov. 2008.

Polikar, Robi "Ensemble Based Systems in Decision Making" IEEE Circuits and Systems Magazine Third qtr 2006, p. 21-47.

U.S. Appl. No. 13/173,088, filed Jun. 30, 2011 Jeffrey P. Grundvig unpublished.

U.S. Appl. No. 13/096,873, filed Apr. 28, 2011 Ross S. Wilson unpublished.

U.S. Appl. No. 13/952,415, filed Jul. 26, 2013 Shaohua Yang unpublished.

U.S. Appl. No. 13/186,267, filed Jul. 19, 2011 Haitao Xia unpublished.

U.S. Appl. No. 13/242,983, filed Sep. 23, 2011 Jeffrey P. Grundvig unpublished.

U.S. Appl. No. 13/490,913, filed Jun. 7, 2012 Xun Zhang unpublished.

U.S. Appl. No. 13/491,135, filed Jun. 7, 2012 Xun Zhang unpublished.

U.S. Appl. No. 13/777,937, filed Feb. 26, 2013 Rui Cao unpublished.

U.S. Appl. No. 13/941,464, filed Jul. 13, 2013 Bruce A. Wilson unpublished.

U.S. Appl. No. 13/100,021, filed May 3, 2011 Haitao Xia unpublished.

Weller et al "Thermal Limits in Ultrahigh-density Magnetic Recording" IEEE Trans. Magn. vol. 35, No. 6, p. 4423, Nov. 1999.

* cited by examiner

ARRAY-READER BASED MAGNETIC RECORDING SYSTEMS WITH FREQUENCY DIVISION MULTIPLEXING

CROSS REFERENCE TO RELATED APPLICATIONS

The present application claims priority to (is a non-provisional of) U.S. Pat. App. No. 61/858,610, entitled "Array-Reader Based Magnetic Recording Systems With Frequency Division Multiplexing", and filed Jul. 25, 2013 by Mathew et al, the entirety of which is incorporated herein by reference for all purposes.

FIELD OF THE INVENTION

Various embodiments of the present invention provide systems and methods for processing data, and more particularly to systems and methods for multiplexing signals from an array-reader in a magnetic recording system.

BACKGROUND

In a typical magnetic storage system, digital data is stored in a series of concentric circular tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned anew over the track as the storage medium is rotated. In this position, the previously stored magnetic flux pattern induces a current in the head assembly that can be converted to the previously recorded digital data.

BRIEF SUMMARY

Embodiments of the present invention provide a magnetic recording system having an array of analog inputs operable to receive analog signals retrieved from a magnetic storage medium, a modulator operable to combine the analog signals to yield a frequency division multiplexed signal, a demodulator operable to yield a plurality of demodulated signals from the frequency division multiplexed signal corresponding to each channel of the array, and a joint equalizer operable to filter the plurality of demodulated signals to yield an equalized output.

This summary provides only a general outline of some embodiments according to the present invention. Many other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Embodiments of the present invention are related to systems and methods for multiplexing signals from an array-reader in a magnetic recording system using frequency division multiplexing (FDM). In an array-reader, an array of read heads is provided, yielding multiple data streams. The multiple data streams can be used in some embodiments to improve noise compensation, for example reducing inter-track interference by reading a data track at a number of offsets from the track center, or to increase throughput by reading data bits written on multiple tracks. In some embodiments, the array-reader simultaneously reads a particular data track with multiple read heads at different locations. The data is processed first by a preamplifier in a read/write head, then by a read channel including circuits such as, but not limited to, analog front end, analog to digital converter, equalizer, and data detector circuits. Because the read heads are moved over a storage medium in the magnetic recording system, the preamplifier is connected to the read channel by a flexible cable or flex cable. Each channel of the array-reader output is processed by a separate analog front-end circuit in the read channel, performing functions such as, but not limited to, amplification, biasing, and filtering. The data is recovered by applying a data detection algorithm to a jointly equalized version of the outputs of the array-reader, where the joint equalizer is a multi-input single-output filter or multi-input multi-output filter. With N read heads in the array, the read channel includes N analog front-end circuits in the read channel, which would require N pairs of flex cables to deliver the signals from the preamplifier to the read channel without the frequency division multiplexing of array-reader signals disclosed herein.

In some embodiments, the array-reader based magnetic storage system with frequency division multiplexing combines the N channels of signals into one channel with N times the bandwidth inside the preamplifier, thereby saving flex cables and analog circuitry. The storage system uses one pair of flex cables to deliver the signals from the preamplifier to the read channel. In some embodiments, the read channel includes one high bandwidth analog front end and one high speed analog to digital converter. In some embodiments, demodulation is performed in the analog domain, and the read channel includes N normal speed analog to digital converters. In some embodiments, frequency division multiplexing is used to reduce the number of flex cables, while still including more than one pair of flex cables.

Figure 1:
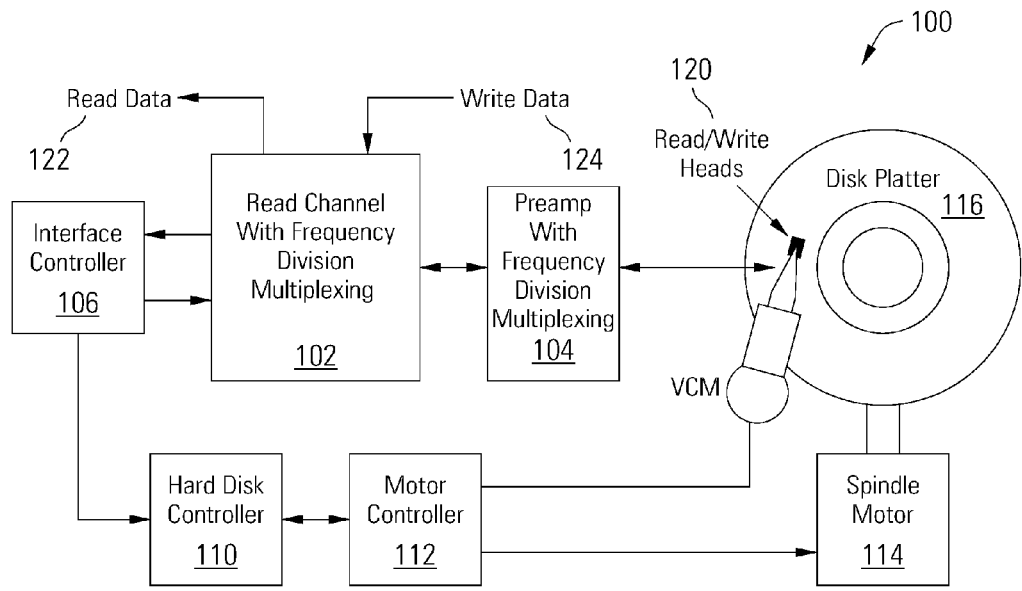
FIG. 1 depicts a magnetic storage system including an array-reader with frequency division multiplexing in accordance with some embodiments of the present invention.

Turning to FIG. 1, an array-reader based magnetic storage system 100 with frequency division multiplexing is depicted in accordance with some embodiments of the present invention. The storage system 100 includes a read channel circuit 102 with frequency division multiplexing. Storage system 100 may be, for example, a hard disk drive. Storage system 100 also includes a preamplifier 104, an interface controller 106, a hard disk controller 110, a motor controller 112, a spindle motor 114, a disk platter 116, and a read/write head assembly 120. Interface controller 106 controls addressing and timing of data to/from disk platter 116. The data on disk platter 116 consists of groups of magnetic signals that may be detected by read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, magnetic signals representing data on disk platter 116 are sensed by an array-reader in read/write head assembly 120 as disk platter 116 is rotated by spindle motor 114. The sensed magnetic signals are provided as continuous, minute analog signals representative of the magnetic data on disk platter 116. These minute analog signals are processed by preamplifiers 104 and modulated using frequency division multiplexing, then transferred to read channel circuit 102 via one or more pairs of flex cables. Preamplifier 104 is operable to amplify the minute analog signals accessed from disk platter 116 for each of the N channels. In turn, read channel circuit 102 demodulates, digitizes and decodes the received analog signal to recreate the information originally written to disk platter 116. This data is provided as read data 122 to a receiving circuit. The modulation and demodulation using frequency division multiplexing can be implemented consistent with the disclosure below in relation to FIGS. 2-13. In some embodiments, the data processing is performed consistent with the flow diagram disclosed below in relation to FIG. 14. A write operation is substantially the opposite of the preceding read operation with write data 124 being provided to read channel circuit 102. This data is then encoded and written to disk platter 116.

Figure 2:
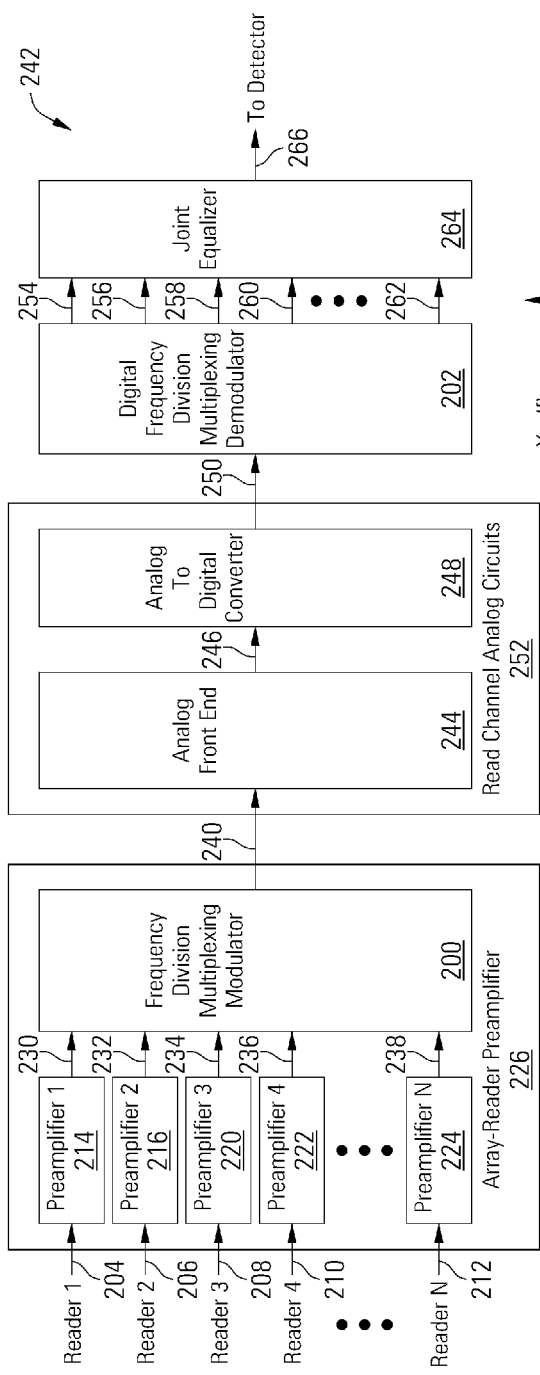
FIG. 2 depicts an array reader magnetic recording system with frequency division multiplexing and digital demodulator in accordance with some embodiments of the present invention.

Turning to FIG. 2, an array reader magnetic recording system 242 with frequency division multiplexing modulator 200 and digital frequency division multiplexing demodulator 202 is depicted in accordance with some embodiments of the present invention. A number N of analog inputs 204, 206, 208, 210, 212 from an array-reader are provided to preamplifiers 214, 216, 220, 222, 224 in an array-reader preamplifier 226, yielding amplified analog signals 230, 232, 234, 236, 238. In some embodiments, each of the preamplifiers 214-224 is adapted to the characteristics of its associated analog input 204-212 and the reader in the array-reader from which the analog input is obtained. Each of the N channels has a bandwidth of B Hz each, and each of the preamplifiers 214-224 has a bandwidth of at least B Hz. The preamplifiers 214-224 may be any circuit known in the art or that may be developed in the future that is capable of amplifying analog signals. Based upon the disclosure provided herein, one of ordinary skill in the art will recognize a variety of amplifier circuits that may be used in relation to different embodiments of the present invention.

Amplified analog signals 230-238 from preamplifiers 214-224 are provided to the frequency division multiplexing modulator 200 in the array-reader preamplifier 226. In some embodiments, the frequency division multiplexing modulator 200 combines the N channels into one channel by frequency shifting each channel appropriately and combining the result to yield an analog signal 240 with a bandwidth of about NB Hz, transmitting the analog signal 240 to a read channel 242 on flex cables (or any other suitable connection). The analog signal 240 is processed in an analog front end circuit 244, an analog circuit with a bandwidth of at least NB Hz. The analog front end circuit 244 performs functions such as, but not limited to, amplification, biasing, and filtering of the analog signal 240, yielding processed analog signal 246. The analog front end circuit 244 may be any circuit known in the art for processing an analog signal prior to sampling and further processing such as equalization and value detection. Based upon the disclosure provided herein, one of ordinary skill in the art will recognize a variety of analog front end circuits that may be used in relation to different embodiments of the present invention.

The processed analog signal 246 is provided to an analog to digital converter (ADC) 248 which samples the processed analog signal 246 to yield a stream of digital data samples 250. The analog to digital converter 248 has a bandwidth of at least about NB Hz with a sampling rate at least N times that required for one channel. For example, in some embodiments, the sampling rate for a single channel would be 2B samples/sec, and the analog to digital converter 248 has a sampling rate of 2NB samples/sec to support the N multiplexed channels. Analog to digital converter 248 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. The analog circuits 252 in read channel 242 thus are high speed, high bandwidth analog circuits adapted to process the N-channel frequency division multiplexed analog signals.

The data samples 250 are provided to a digital frequency division multiplexing demodulator 202 which operates to frequency shift and separate the signal in data samples 250 into N individual data channels 254, 256, 258, 260, 262, each with a sampling rate of 2B samples/sec, each corresponding with one of the analog inputs 204-212. The N data channels 254-262 are provided to a joint equalizer 264, which equalizes or filters the N data channels 254-262. In some embodiments, the joint equalizer 264 applies digital finite impulse response filtering to the N data channels 254-262 to yield equalized data samples 266 for the data track based on the N data channels 254-262. The joint equalizer 264 thus increases the signal to noise ratio for the data track based on the information in the multiple channels from the array-reader. Based upon the disclosure provided herein, one of ordinary skill in the art will recognize a variety of equalizer circuits that may be used in relation to different embodiments of the present invention. The equalized data samples 266 may be subsequently processed in any suitable manner, such as in a Viterbi algorithm detector to identify the values in the equalized data samples 266. If the array-reader is configured such that the signals 204-212 are coming from the readback of multiple tracks on the medium 116, the joint equalizer 264 can be configured to result in multiple output signal streams to facilitate detection of data bits from multiple tracks on the medium 116.

Figure 3:
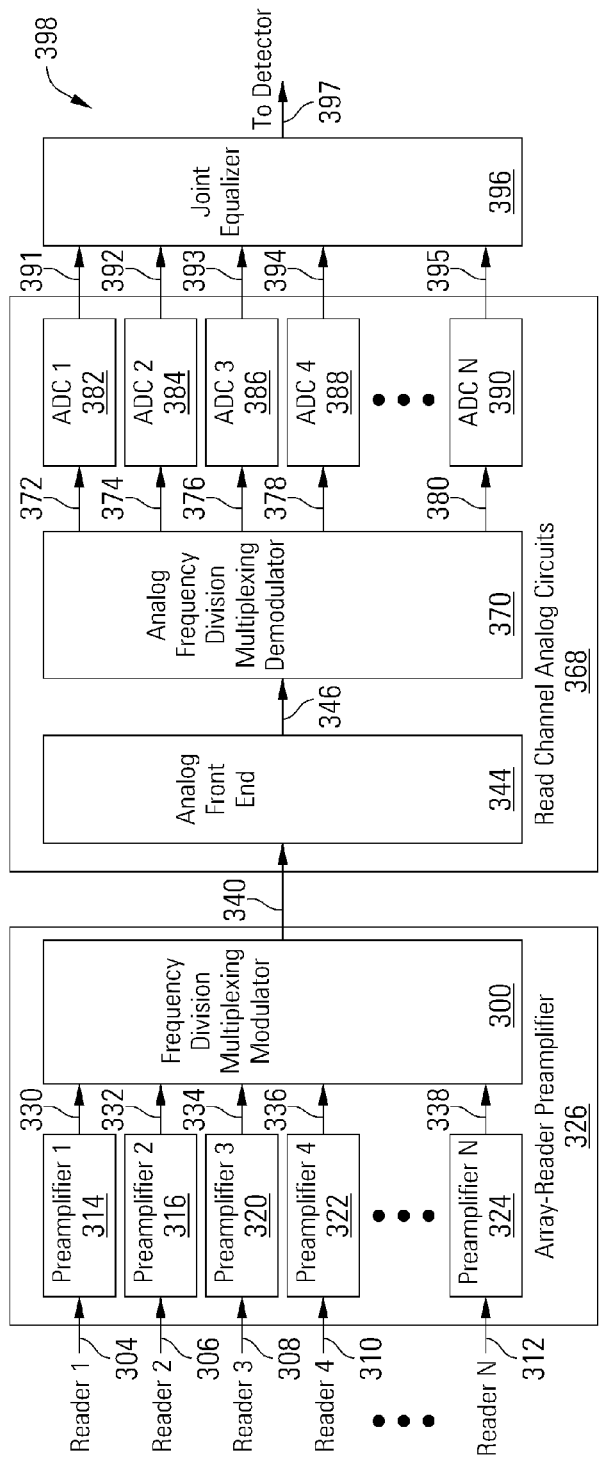
FIG. 3 depicts an array reader magnetic recording system with frequency division multiplexing and analog demodulator in accordance with some embodiments of the present invention.

Turning to FIG. 3, an array reader magnetic recording system with frequency division multiplexing modulator 300 and analog frequency division multiplexing demodulator 370 in accordance with some embodiments of the present invention. In this embodiment, the analog frequency division multiplexing demodulator 370 performs the demodulation in the analog circuits 368 of the read channel 398, and N analog to digital converters 382, 384, 386, 388, 390 are provided, each with a sampling rate of 2B samples/sec and a bandwidth at least high enough to support the demodulated signals.

A number N of analog inputs 304, 306, 308, 310, 312 from an array-reader are provided to preamplifiers 314, 316, 320, 322, 324 in an array-reader preamplifier 326, yielding amplified analog signals 330, 332, 334, 336, 338. In some embodiments, each of the preamplifiers 314-324 are adapted to the characteristics of its associated analog input 304-312 and the reader in the array-reader from which the analog input is obtained. Each of the N channels has a bandwidth of B Hz each, and each of the preamplifiers 314-324 has a bandwidth of at least B Hz. The preamplifiers 314-324 may be any circuit known in the art or that may be developed in the future that is capable of amplifying analog signals. Based upon the disclosure provided herein, one of ordinary skill in the art will recognize a variety of amplifier circuits that may be used in relation to different embodiments of the present invention.

Amplified analog signals 330-338 from preamplifiers 314-324 are provided to the frequency division multiplexing modulator 300 in the array-reader preamplifier 326. In some embodiments, the frequency division multiplexing modulator 300 combines the N channels into one channel by frequency shifting each channel appropriately and combining the result to yield an analog signal 340 with a bandwidth of about NB Hz, transmitting the analog signal 340 to a read channel 398 on a pair of flex cables (or any other suitable connection). The analog signal 340 is processed in an analog front end circuit 344, an analog circuit with a bandwidth of at least NB Hz. The analog front end circuit 344 performs functions such as, but not limited to, amplification, biasing, and filtering of the analog signal 340, yielding processed analog signal 346. The analog front end circuit 344 may be any circuit known in the art for processing an analog signal prior to sampling and further processing such as equalization and value detection. Based upon the disclosure provided herein, one of ordinary skill in the art will recognize a variety of analog front end circuits that may be used in relation to different embodiments of the present invention.

The processed analog signal 346 is provided to an analog frequency division multiplexing demodulator 370 which operates to frequency shift and separate the signal in processed analog signal 346 into N individual analog signals 372, 374, 376, 378, 380, each with a bandwidth of B Hz, each corresponding with one of the analog inputs 304-312. The N analog signals 372-380 are each provided to analog to digital converters (ADC) 382, 384, 386, 388, 390 which sample the N analog signals 372-380 to yield N streams of digital data samples 391, 392, 393, 394, 395. The analog to digital converters 382-390 each have a bandwidth of at least about B Hz with a sampling rate of 2B samples/sec. Analog to digital converters 382-390 may be any circuits known in the art that are capable of producing digital samples corresponding to an analog input signal. Based upon the disclosure provided herein, one of ordinary skill in the art will recognize a variety of analog to digital converter circuits that may be used in relation to different embodiments of the present invention. The analog front end 344 in read channel 398 is thus a high bandwidth circuit adapted to process the N-channel frequency division multiplexed analog signal 340, while the analog to digital converters 382-390 are lower bandwidth circuits.

The N streams of digital data samples 391-395 are provided to a joint equalizer 396, which equalizes or filters the N streams of digital data samples 391-395. In some embodiments, the joint equalizer 396 applies digital finite impulse response filtering to the N streams of digital data samples 391-395 to recover equalized data samples 397 for the data track. The joint equalizer 396 thus increases the signal to noise ratio for the data track based on the information in the multiple channels from the array-reader. The equalized data samples 397 may be subsequently processed in any suitable manner, such as in a Viterbi algorithm detector to identify the values in the equalized data samples 397. In some embodiments, the joint equalizer 396 output consists of multiple streams of digital samples to facilitate detection of data bits from multiple tracks on the storage medium.

Figure 4A:
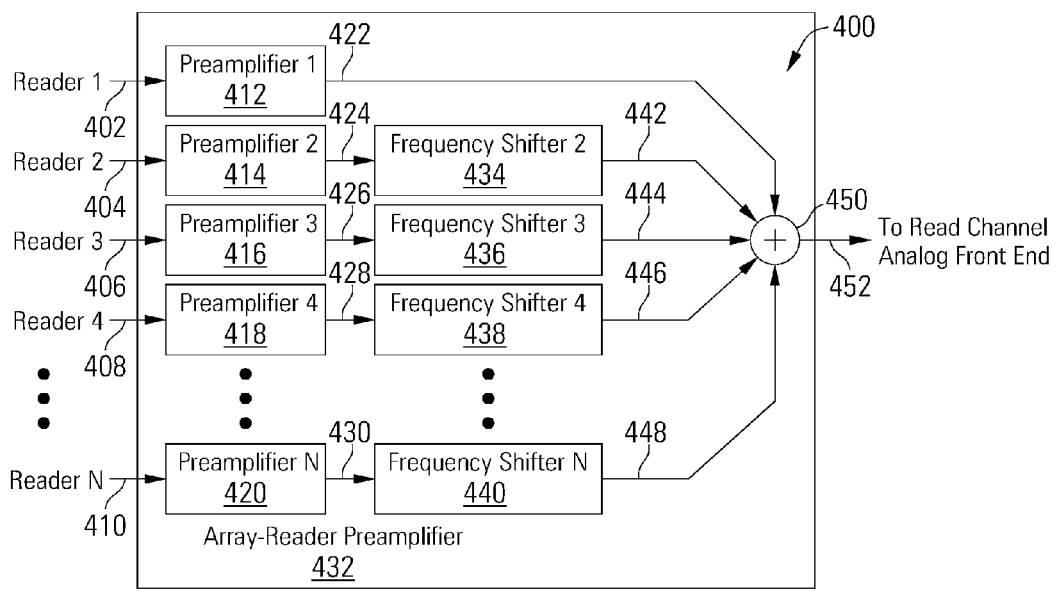
FIG. 4A depicts a frequency division multiplexing modulator in accordance with some embodiments of the present invention.

Turning to FIG. 4A, a frequency division multiplexing modulator 400 is depicted, integrated in an array-reader preamplifier 432 with N channel preamplifiers 412, 414, 416, 418, 420, in accordance with some embodiments of the present invention. The frequency division multiplexing modulator 400 can be used in place of the frequency division multiplexing modulator 200 of FIG. 2 in some embodiments. The frequency division multiplexing modulator 400 includes a frequency shifter for each channel but a reference channel, and a summer to combine the resulting signals.

A number N of analog inputs 402, 404, 406, 408, 410 from an array-reader are provided to preamplifiers 412, 414, 416, 418, 420 in an array-reader preamplifier 432, yielding amplified analog signals 422, 424, 426, 428, 430. In some embodiments, each of the preamplifiers 412-420 are adapted to the characteristics of its associated analog input 402-410 and the reader in the array-reader from which the analog input is obtained. Each of the N channels has a bandwidth of B Hz each, and each of the preamplifiers 412-420 has a bandwidth of at least B Hz. The preamplifiers 412-420 may be any circuit known in the art or that may be developed in the future that is capable of amplifying analog signals. Based upon the disclosure provided herein, one of ordinary skill in the art will recognize a variety of amplifier circuits that may be used in relation to different embodiments of the present invention.

Amplified analog signals 422-430 from preamplifiers 412-420 are provided to the frequency division multiplexing modulator 400 in the array-reader preamplifier 432. All the amplified analog signals 424-430 except the reference analog signal 422 are provided to frequency shifters 434, 436, 438, 440. In some embodiments, any of the channels can be selected as the reference channel. During the frequency division multiplexing modulation, the reference channel remains at the baseband frequency, with the other channels frequency shifted around the reference channel. During the demodulation, the shifted channels are restored to their original frequencies in some embodiments.

The frequency shifters 434-440 shift the frequencies to non-overlapping bands and, in some embodiments, selectively remove side-bands from each channel. The frequency shifter for the $k^{th}$ channel translates the spectrum of the $k^{th}$ channel by kB Hz where B is half the data rate (bits/sec) of each channel. In some embodiments, the frequency shifted signal is passed through a single side-band (SSB) chopper that applies a bandpass filter to retain only one copy of the lower and upper side-bands from each channel in the shifted frequency axis.

The frequency shifters 434-440 yield shifted analog signals 442, 444, 446, 448, which are combined with each other and with the reference analog signal 422 in a summer 450 to yield a frequency division multiplexed analog signal 452. The frequency division multiplexed analog signal 452 contains the signal for the $k^{th}$ channel in the frequency band (k−1)B<|f|<kB for k=1, 2, ..., N. The bandwidth of frequency division multiplexed analog signal 452 is about NB Hz, where B is the bandwidth of a single channel. The summer 450 may be any circuit known in the art or that may be developed in the future that is capable of combining analog signals to produce a single analog output containing information from all the inputs. Based upon the disclosure provided herein, one of ordinary skill in the art will recognize a variety of summer circuits that may be used in relation to different embodiments of the present invention.

The frequency division multiplexed analog signal 452 can be transmitted to any suitable receiver, such as, but not limited to, an analog front end in a read channel, using any suitable conductor or transmission medium, such as, but not limited to, a pair of flex cables or flexible printed circuits.

Figure 4B:
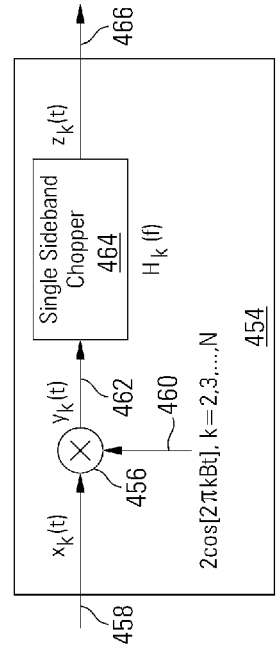
FIG. 4B depicts a frequency shifter suitable for use in the frequency division multiplexing modulator of FIG. 4A in accordance with some embodiments of the present invention.

Turning to FIG. 4B, a frequency shifter 454 is depicted that can be used in the frequency division multiplexing modulator 400 of FIG. 4A in accordance with some embodiments of the present invention. A multiplier 456 multiplies the analog input 458 $x_k(t)$ by frequency shifting signal 460, which in some embodiments is a time varying signal represented by 2 cos [2πkBt], where k=2, 3, ..., N, where N is the number of channels, and where B is the bandwidth of a single channel. The multiplier 456 yields a frequency shifted analog signal 462 $y_k(t)$. The frequency shifting signal 460 may be generated in any suitable manner, and the multiplier 456 may be any suitable circuit known in the art that is capable of multiplying time-varying analog signals. Based upon the disclosure provided herein, one of ordinary skill in the art will recognize a variety of signal generator and multiplier circuits that may be used in relation to different embodiments of the present invention.

The frequency shifted analog signal 462 is provided to a single side-band (SSB) chopper 464 that applies a band-pass filter to retain only one copy of the lower and upper side-bands from each channel in the shifted frequency axis, yielding a frequency shifted analog signal 466 $z_k(t)$ with bandwidth B Hz.

The operation of the multiplier 456 and the single side-band chopper 464 are described in the following equations, in which a capitalized symbol for a signal denotes the Fourier transform of the signal represented by a lower case symbol, that is, $X_k(f)$ is the Fourier transform of $x_k(t)$. The frequency translation performed by some embodiments of the multiplier 456 can be described as:

$$Y_k(f)=X_k(f+kB)+X_k(f-kB), k=2, 3, \ldots, N$$

where $Y_k(f)$ is the Fourier transform of frequency shifted analog signal 462 $y_k(t)$, k is the channel number, N is the total number of channels, and B is the bandwidth of a single channel. The frequency shifted analog signal 462 $y_k(t)$ is thus shifted to a positive and negative offset of kB from the center frequency zero, with both side-bands appearing at the positive and negative offset. The chopping performed by some embodiments of the single side-band chopper 464 can be described as:

$$Z_k(f) = H_k(f) \cdot Y_k(f)$$
$$= Y_k(f) \text{ for } (k-1)B \le |f| \le kB$$
$$= 0 \text{ otherwise.}$$

where $Z_k(f)$ is the Fourier transform of frequency shifted chopped analog signal 466 and $H_k(f)$ is the transfer function of single side-band chopper 464, which applies the following band-pass filtering:

$$H_k(f) = 1 \text{ for } (k-1)B \le |f| \le kB$$
$$= 0 \text{ otherwise.}$$

The combined frequency division multiplexed analog signal 452 produced by some embodiments of the summer 450 can be described as:

$$Z(f) = X_1(f) + \sum_{k=2}^{N} Z_k(f)$$

where Z(f) is the Fourier transform of the combined frequency division multiplexed analog signal 452, $X_1(f)$ is the Fourier transform of the reference analog signal 422, and $Z_k(f)$ is the Fourier transform of the frequency shifted chopped analog signal 466 $z_k(t)$ for each channel k other than the reference channel.

Figure 4C:
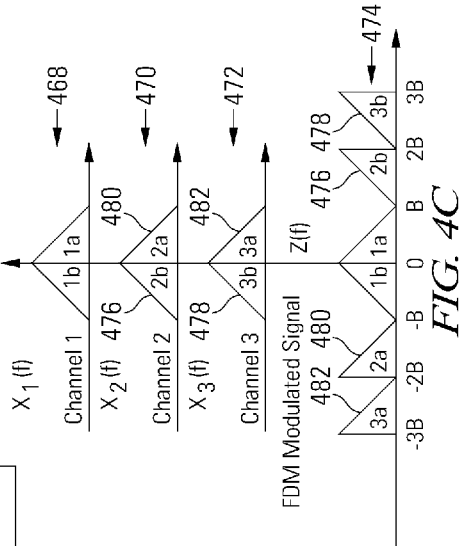
FIG. 4C depicts a frequency domain chart of multiple reader channels multiplexed by a modulator of FIG. 4A in accordance with some embodiments of the present invention.

Turning to FIG. 4C, a frequency domain spectrum chart shows three array-reader channels multiplexed by an embodiment of the frequency division multiplexing modulator 400 of FIG. 4A. The Fourier transform of the analog signal 422, 424, 426 for three channels $X_1(f)$ 468, $X_2(f)$ 470 and $X_3(f)$ 472 is depicted prior to frequency shifting and chopping. Each of the three channels $X_1(f)$ 468, $X_2(f)$ 470 and $X_3(f)$ 472 is centered at a center frequency zero prior to frequency shifting. The Fourier transform Z(f) 474 of the combined frequency division multiplexed analog signal 452 combines all three channels, with lower sidebands 476 and 478 of channels two and three frequency shifted with a positive offset, and with upper sidebands 480 and 482 frequency shifted with a negative offset. The single side-band chopper 464 ensures that both side-bands for a frequency shifted channel are not duplicated at the positive and negative offsets. By applying a positive shift to the lower side-bands and a negative shift to the upper side-bands, troughs are provided between each channel in the Fourier transform Z(f) 474, enabling a demodulator to more easily filter the signal to isolate the channels in the modulated signal. Although the frequency bands for each of the channels in FIG. 4C are adjacent, spacing may also be provided between frequency division multiplexing modulated channels during the frequency shifting process to allow the use of practically realizable filters to isolate the channels during demodulation.

Figure 5:
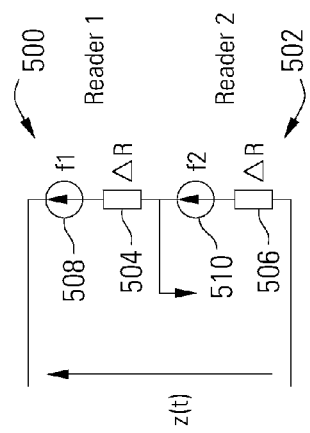
FIG. 5 depicts a head biasing diagram in an array-reader based magnetic storage system with frequency division multiplexing in accordance with some embodiments of the present invention.

Turning to FIG. 5, the frequency division multiplexing modulation is performed in some embodiments using specific modulating frequencies in the biasing circuit for each of the array-reader read heads. As each read head in the array-reader passes over the magnetic medium, data stored on the magnetic medium modulates a current passing through each read head. Each read head is provided with a biasing circuit 500, 502 adapted to modulate the current in a single analog output signal from the array-reader at a different center frequency for each channel. Thus, a single analog output signal is produced from the array-reader with the channels modulated in frequency division multiplexing fashion. For example, a two-channel array-reader has a magneto-resistive (MR) element 504, 506 for each channel and a current source 508, 510 for each channel, each modulated at a different frequency. Without band-pass filters or a single side-band chopper, this results in doubling the total bandwidth required since the frequencies f1 and f2 are such that the signals from the two channels do not overlap in the frequency domain. However, in a two-channel embodiment, this bandwidth expansion can be avoided by limiting the bandwidth of the combined signal to [−2B, 2B] where 2B is the data rate, and choosing f1=0 and f2=2B, and ignoring the band beyond 2B Hz as that will be rejected by the analog front-end circuit of the read channel.

Figure 6B:
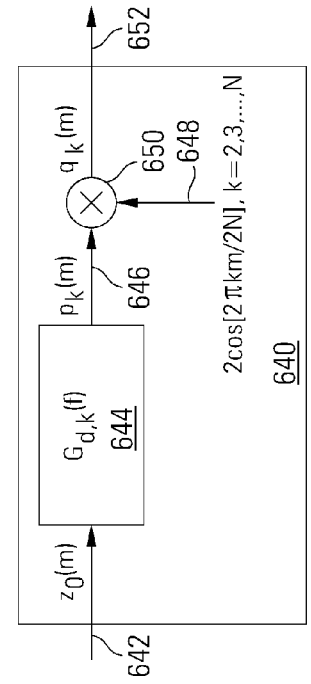
FIG. 6B depicts a digital frequency shifter suitable for use in the digital frequency division multiplexing demodulator of FIG. 6A in accordance with some embodiments of the present invention.
Figure 6A:
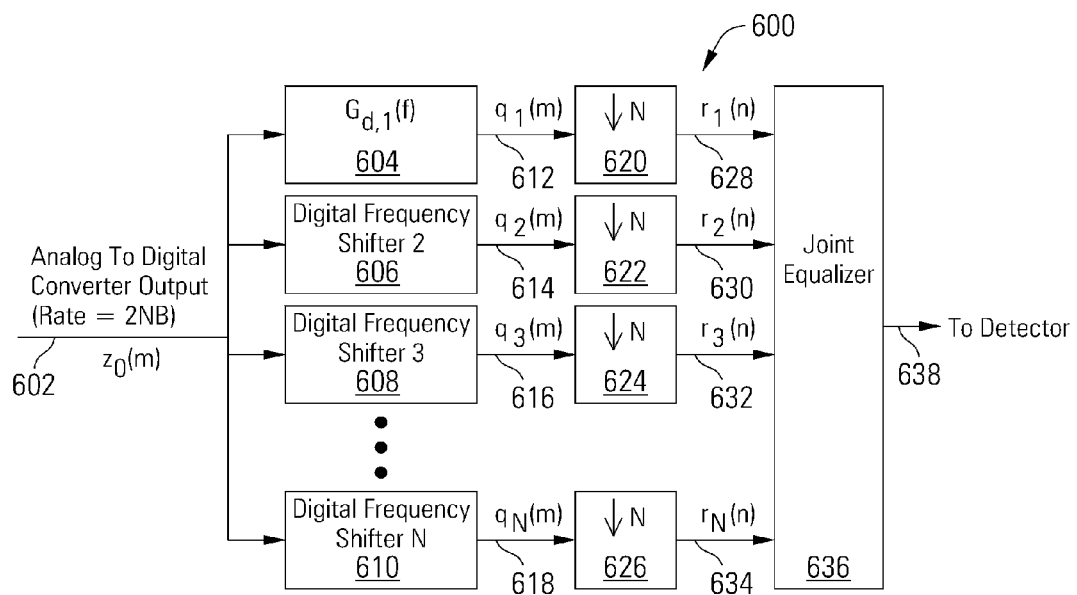
FIG. 6A depicts a digital frequency division multiplexing demodulator in accordance with some embodiments of the present invention.

Turning to FIG. 6A, a digital frequency division multiplexing demodulator 600 is depicted in accordance with some embodiments of the present invention. The digital frequency division multiplexing demodulator 600 can be used in place of the digital frequency division multiplexing demodulator 202 of FIG. 2 in some embodiments. A digital signal 602 $z_0(m)$ carrying multiple channels in frequency division multiplexed format, derived or received from an analog to digital converter, is received to be demodulated by digital frequency division multiplexing demodulator 600. The digital signal 602 has a sampling rate of 2NB samples/sec. To extract the reference channel, the digital signal 602 is provided to a low pass filter 604, filtering out the frequency shifted side-bands of other channels and yielding digital signal 612 $q_1(m)$ for the reference channel, still having a sampling rate of 2NB samples/sec. The low pass filter 604 is a digital low pass filter of bandwidth B Hz. The low pass filter 604 may be any circuit known in the art that is capable of filtering a digital signal to substantially leave only the reference channel. Based upon the disclosure provided herein, one of ordinary skill in the art will recognize a variety of low pass filter circuits that may be used in relation to different embodiments of the present invention. The digital signal 612 is passed through a down-sampler 620 or decimator which decimates or down-samples the digital signal 612 at a 1/N rate, yielding digital signal 628 $r_1(n)$ for the reference channel at a sampling rate of 2B samples/sec. Thus, for the reference channel, demodulation involves low-pass filtering with bandwidth B Hz followed by decimation in some embodiments.

To extract channels 2-N other than the reference channel, the digital signal 602 is provided to digital frequency shifters 606, 608, 610, each adapted to extract a particular one of the channels by band-pass filtering out other channels to leave only the desired channel, and frequency shifting the resulting signal back to the center frequency zero, yielding digital signals 614, 616, 618 $q_2(m), q_3(m), \ldots, q_N(m)$ for the channels other than the reference channel, each still having a sampling rate of 2NB samples/sec. The digital signals 614-618 are passed through down-samplers 622, 624, 626 which decimate the digital signals 614-618 at a 1/N rate, yielding digital signals 630, 632, 634 $r_2(n), r_3(n), \ldots, r_N(n)$ each at a sampling rate of 2B samples/sec. The down-samplers 620-626 may be any circuit known in the art that is capable of sampling a signal or otherwise reducing the data rate of a digital signal. Based upon the disclosure provided herein, one of ordinary skill in the art will recognize a variety of down-sampling circuits that may be used in relation to different embodiments of the present invention. Thus, for channels other than the reference channel, demodulation involves isolating the desired channel using a band-pass filter, frequency shifting the channel to baseband, and down-sampling the channel to the underlying data rate in some embodiments.

The N digital signals 628-634 are provided to a joint equalizer 636 which applies digital finite impulse response filtering to the digital signals 628-634 to yield equalized data samples 638 for the data track based on the N digital signals 628-634. The joint equalizer 636 thus increases the signal to noise ratio for the data track based on the information in the multiple channels from the array-reader. Based upon the disclosure provided herein, one of ordinary skill in the art will recognize a variety of equalizer circuits that may be used in relation to different embodiments of the present invention. The equalized data samples 638 may be subsequently processed in any suitable manner, such as in a Viterbi algorithm detector to identify the values in the equalized data samples 638. In some embodiments, the joint equalizer 636 output consists of multiple streams of digital samples to facilitate detection of data bits from multiple tracks on the storage medium.

Turning to FIG. 6B, a digital frequency shifter 640 is depicted that can be used in the digital frequency division multiplexing demodulator 600 of FIG. 6A in accordance with some embodiments of the present invention. The digital frequency shifter 640 receives a digital input signal 642 $z_0(m)$ with a sampling rate of 2NB samples/sec, and processes the digital input signal 642 in a band-pass filter 644. The band-pass filter 644 filters out the unwanted channels in digital input signal 642, leaving only the signal for the channel being retrieved by the digital frequency shifter 640, yielding a single channel digital signal 646 $p_k(m)$. The band-pass filter 644 is a digital band-pass filter in the band $(k-1)B \le |f| \le kB$.

A multiplier 650 multiplies the single channel digital signal 646 $p_k(m)$ by frequency shifting signal 648, which in some embodiments is a digital signal represented by 2 cos $[2\pi km/2N]$, where $k=2, 3, \ldots, N$, where N is the number of channels, and where m is the sample index. The multiplier 650 yields a frequency shifted digital signal 652 $q_k(m)$ having sampling rate 2NB, which has been shifted back to the center frequency zero. The frequency shifting signal 648 may be generated in any suitable manner, and the multiplier 650 and bandpass filter 644 may be any suitable circuits known in the art that is capable of multiplying and filtering digital signals. Based upon the disclosure provided herein, one of ordinary skill in the art will recognize a variety of signal generator, multiplier and band-pass filter circuits that may be used in relation to different embodiments of the present invention.

The operation of the digital frequency division multiplexing demodulator 600 in some embodiments is described in the following equations, in which a capitalized symbol for a signal denotes the Fourier transform of the signal represented by a lower case symbol, that is, $Z_{d,0}(f)$ is the Fourier transform of $z_o(m)$, the frequency division multiplexing modulated digital input signal 602 or FDM combined signal. The subscript d in $Z_{d,0}(f)$ and other symbols denotes that it represents a digital signal. $Z_{d,0}(f)$, the Fourier transform of the FDM combined signal, can be described in some embodiments as:

$$Z_{d,0}(f) = X_{d,1}(f) + \sum_{k=2}^{N} Z_{d,k}(f),$$

$$k = 2, 3, \ldots, N$$

where $X_{d,1}(f)$ is the Fourier transform of the reference channel and $Z_{d,k}(f)$ is the Fourier transform of the each other channel k. The Fourier transform $Z_{d,k}(f)$ of each channel k in the FDM combined signal can be described in some embodiments as:

$$Z_{d,k}(f) = Y_{d,k}(f) \quad \text{for } (k-1)B \le |f| \le kB$$

$$= 0 \quad \text{otherwise.}$$

with $Y_{d,k}(f)$ containing side-bands which for all channels k other than the reference channel, are shifted in some embodiments according to:

$$Y_{d,k}(f) = X_{d,k}(f+kB) + X_{d,k}(f-kB), k=2, 3, \ldots, N$$

where $X_{d,k}(f)$ is the Fourier transform of channel k without frequency shifting, N is the total number of channels, and B is the bandwidth of a single channel. The band-pass filter 644 applies transfer function $G_{d,k}(f)$ to obtain single channel digital signal 646 $p_k(m)$ in some embodiments as follows:

$$P_{d,k}(f) = G_{d,k}(f) \cdot Z_{d,0}(f) = Z_{d,k}(f)$$

In some embodiments, the multiplier 650 applies frequency shifting signal 648 to single channel digital signal 646 $p_k(m)$ for channels other than the reference channel, shifting the frequency back to baseband to yield recovered digital channel 652 $q_k(m)$ as follows:

$$Q_{d,k}(f) = Z_{d,k}(f+kB) + Z_{d,k}(f-kB) = X_{d,k}(f)$$

The band-pass filter 644 can be described in some embodiments as:

$$G_{d,k}(f) = 1 \quad \text{for } (k-1)B \le |f| \le kB$$

$$= 0 \quad \text{otherwise.}$$

For the reference channel, the low pass filter 604 isolates the channel 612 $q_1(m)$ from other channels in some embodiments as follows:

$$Q_{d,1}(f) = G_{d,1}(f) \cdot Z_{d,0}(f) = X_{d,1}(f)$$

where the low pass transfer function $G_{d,1}(f)$ may be defined as:

$$G_{d,1}(f) = 1 \quad \text{for } -B \le f \le B$$

$$= 0 \quad \text{otherwise.}$$

Figure 6C:
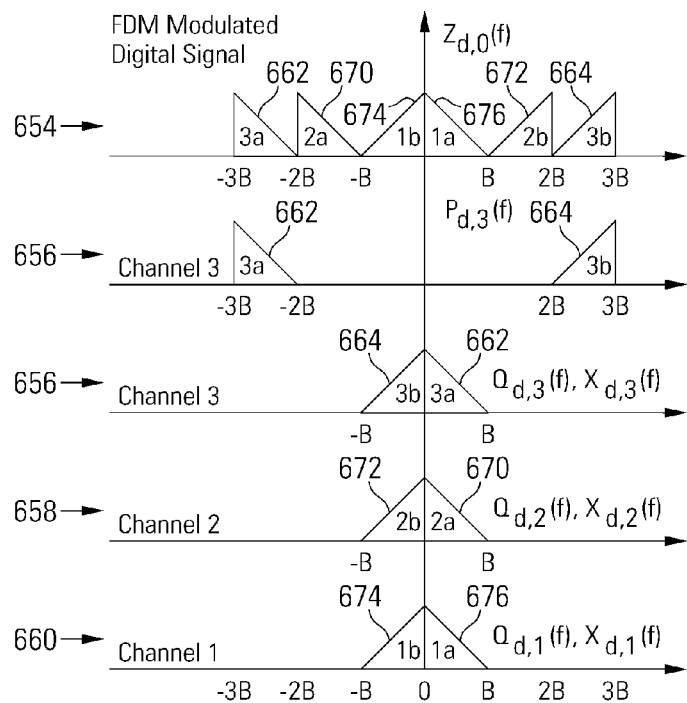
FIG. 6C depicts a frequency domain chart of multiple reader channels demodulated by a demodulator of FIG. 6A in accordance with some embodiments of the present invention.

Turning to FIG. 6C, a frequency domain chart shows three array-reader channels in a digital frequency division multiplexed combined signal 654, demodulated by the digital frequency division multiplexing demodulator 600 to yield three separate channels 656, 658, 660. To isolate and recover channel 3 656, the signals for channels 1 and 2 are filtered out by band-pass filter 644, and side-bands 662, 664 are frequency shifted by multiplier 650 back to the baseband frequency. To isolate and recover channel 2 658, the signals for channels 1 and 3 are filtered out by band-pass filter 644, and side-bands 670, 672 are frequency shifted by multiplier 650 back to the baseband frequency. To isolate channel 1 660, low pass filter 604 filters out channels 2 and 3, leaving channel 1 at the baseband.

Figure 7A:
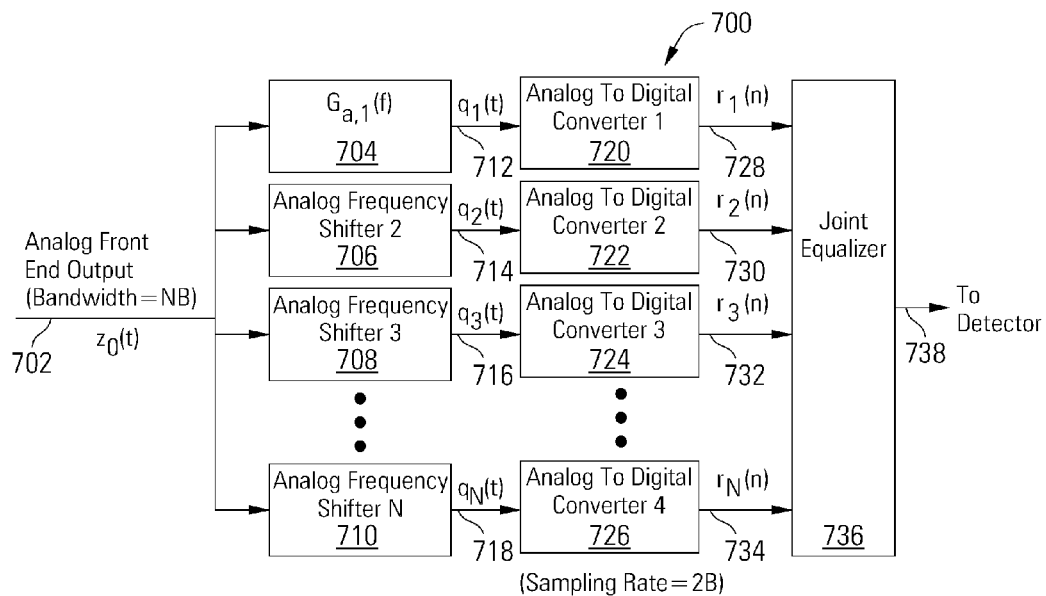
FIG. 7A depicts an analog frequency division multiplexing demodulator in accordance with some embodiments of the present invention.

Turning to FIG. 7A, an analog frequency division multiplexing demodulator 700 is depicted in accordance with some embodiments of the present invention. An analog front end output 702 $z_0(t)$ is received by the analog frequency division multiplexing demodulator 700, being a frequency division multiplexing modulated analog signal having a bandwidth of NB Hz. The analog frequency division multiplexing demodulator 700 can be used in place of the analog frequency division multiplexing demodulator 370 of FIG. 3 in some embodiments. To extract the reference channel, the analog front end output 702 is provided to an analog low pass filter 704, filtering out the frequency shifted side-bands of other channels and yielding analog signal 712 $q_1(t)$ for the reference channel, having a bandwidth of B Hz. The low pass filter 704 is an analog low pass filter of bandwidth B. The low pass filter 704 may be any circuit known in the art that is capable of filtering an analog signal to substantially leave only the reference channel. Based upon the disclosure provided herein, one of ordinary skill in the art will recognize a variety of low pass filter circuits that may be used in relation to different embodiments of the present invention. The analog signal 712 is sampled by an analog to digital converter 720 at a sampling rate of 2B, the data rate of each individual channel, yielding digital signal 728 $r_1(n)$ representing the reference channel. Thus, for the reference channel, demodulation involves low-pass filtering with bandwidth B followed by sampling and digitization using an analog to digital converter running at the basic data rate for a single channel.

To extract channels 2-N other than the reference channel, the analog front end output 702 is provided to analog frequency shifters 706, 708, 710, each adapted to extract a particular one of the channels by band-pass filtering out other channels to leave only the desired channel, and frequency shifting the resulting signal back to the center frequency zero, yielding analog signals 714, 716, 718 $q_2(t), q_3(t), \ldots, q_N(t)$ for the channels other than the reference channel, each having a bandwidth of B Hz. The analog signals 714-718 are passed through sampled by analog to digital converters 722, 724, 726 at a sampling rate of 2B, the data rate of each individual channel, yielding digital signals 730, 732, 734 $r_2(n)$, $r_3(n), \ldots, r_N(n)$ representing the channels other than the reference channel. Thus, for channels other than the reference channel, analog demodulation involves isolating the desired channel using a band-pass filter, frequency shifting the channel to baseband, and sampling and digitization using analog to digital converters running at the basic data rate for a single channel. Analog to digital converters 720-726 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

The N digital signals 728-734 are provided to a joint equalizer 736 which applies digital finite impulse response filtering to the digital signals 728-734 to yield equalized data samples 738 for the data track based on the N digital signals 728-734. The joint equalizer 736 thus increases the signal to noise ratio for the data track based on the information in the multiple channels from the array-reader. Based upon the disclosure provided herein, one of ordinary skill in the art will recognize a variety of equalizer circuits that may be used in relation to different embodiments of the present invention. The equalized data samples 738 may be subsequently processed in any suitable manner, such as in a Viterbi algorithm detector to identify the values in the equalized data samples 738. In some embodiments, the joint equalizer 736 output consists of multiple streams of digital samples to facilitate detection of data bits from multiple tracks on the storage medium.

Figure 7B:
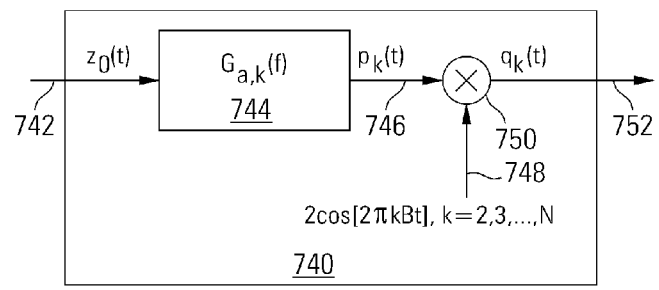
FIG. 7B depicts an analog frequency shifter suitable for use in the analog frequency division multiplexing demodulator of FIG. 7A in accordance with some embodiments of the present invention.

Turning to FIG. 7B, an analog frequency shifter 740 is depicted that can be used in the analog frequency division multiplexing demodulator 700 of FIG. 7A in accordance with some embodiments of the present invention. The analog frequency shifter 740 receives an analog input signal 742 $z_0(t)$ with a bandwidth of NB, and processes the analog input signal 742 in an analog band-pass filter 744. The band-pass filter 744 filters out the unwanted channels in analog input signal 742, leaving only the signal for the channel being retrieved by the analog frequency shifter 740, yielding a single channel analog signal 746 $p_k(t)$. The band-pass filter 744 is an analog band-pass filter in the band $(k-1)B \leq |f| \leq kB$.

A multiplier 750 multiplies the single channel analog signal 746 $p_k(t)$ by frequency shifting signal 748, which in some embodiments is an analog signal represented by 2 cos $[2\pi kBt]$, where $k=2, 3, \ldots, N$, where N is the number of channels, and where B is the bandwidth of a single analog channel. The multiplier 750 yields a frequency shifted analog signal 752 $q_k(t)$ having bandwidth B Hz, but having been shifted back to the baseband. The frequency shifting signal 748 may be generated in any suitable manner, and the multiplier 750 and bandpass filter 744 may be any suitable circuits known in the art that is capable of multiplying and filtering analog signals. Based upon the disclosure provided herein, one of ordinary skill in the art will recognize a variety of signal generator, multiplier and band-pass filter circuits that may be used in relation to different embodiments of the present invention.

Figure 8A:
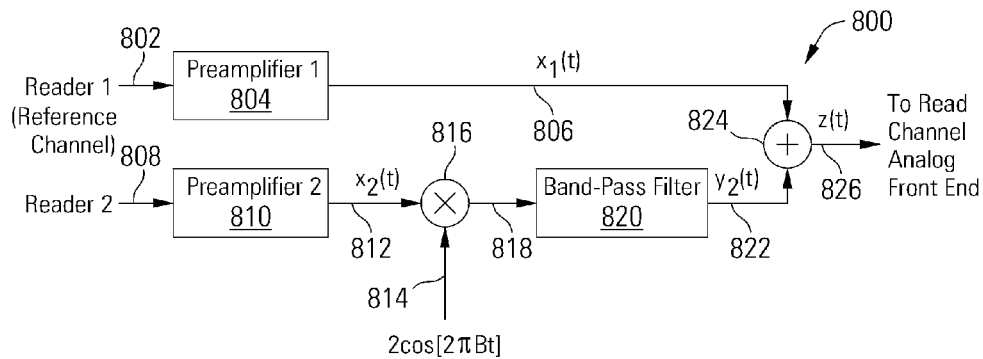
FIG. 8A depicts a two channel frequency division multiplexing modulator in accordance with some embodiments of the present invention.

Turning to FIG. 8A, a two channel frequency division multiplexing modulator 800 is depicted in accordance with some embodiments of the present invention. An analog signal 802 for a reference channel is provided to preamplifier 804, yielding amplified analog signal 806 $x_1(t)$. An analog signal 808 for a second channel from an array-reader is provided to preamplifier 810, yielding amplified analog signal 812 $x_2(t)$. Each of the analog signals 802, 808 has a bandwidth of B Hz each, and each of the preamplifiers 804, 810 has a bandwidth of at least B. The preamplifiers 804, 810 may be any circuit known in the art or that may be developed in the future that is capable of amplifying analog signals. Based upon the disclosure provided herein, one of ordinary skill in the art will recognize a variety of amplifier circuits that may be used in relation to different embodiments of the present invention.

The amplified analog signal 812 for the second channel is frequency shifted by multiplying amplified analog signal 812 by a frequency shifting signal 814 in multiplier 816, yielding frequency shifted analog signal 818. The frequency shifting signal 814 is in some embodiments a time varying signal represented by 2 cos $[2\pi Bt]$, where B is the bandwidth of a single channel. The frequency shifted analog signal 818 is filtered in band-pass filter 820, removing the lower side-band of channel 2 in the positive side of the frequency axis and the upper side band of channel 2 in the negative side of the frequency axis, thus yielding a frequency shifted and filtered analog signal 822 $y_2(t)$. The frequency shifting signal 814 may be generated in any suitable manner, and the multiplier 816 and band-pass filter 820 may be any suitable circuits known in the art that are capable of multiplying and filtering time-varying analog signals. Based upon the disclosure provided herein, one of ordinary skill in the art will recognize a variety of signal generator, multiplier and band-pass filter circuits that may be used in relation to different embodiments of the present invention.

The analog signal 806 $x_1(t)$ and the frequency shifted and filtered analog signal 822 $y_2(t)$ are combined in summer 824, yielding analog frequency division multiplexed modulated signal 826 $z(t)$. The summer 824 may be any circuit known in the art or that may be developed in the future that is capable of combining analog signals to produce a single analog output containing information from all the inputs. Based upon the disclosure provided herein, one of ordinary skill in the art will recognize a variety of summer circuits that may be used in relation to different embodiments of the present invention.

Figure 8B:
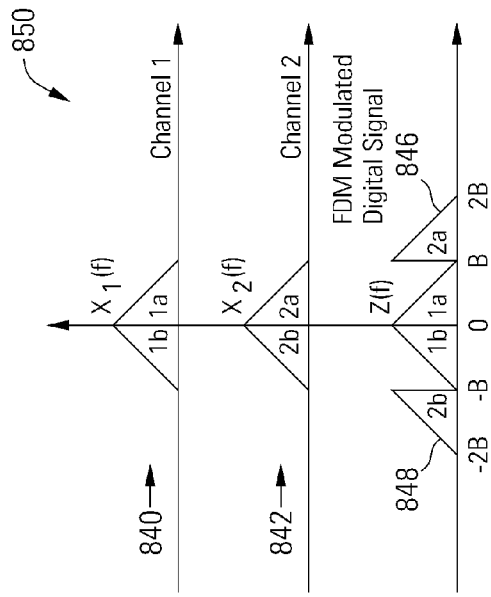
FIG. 8B depicts a frequency domain chart of two reader channels multiplexed by a modulator of FIG. 8A in accordance with some embodiments of the present invention.

Turning to FIG. 8B, a frequency domain chart 850 depicts two reader channels multiplexed by a modulator 800 of FIG. 8A in accordance with some embodiments of the present invention. The signal for the reference channel 1 840 is left at the baseband, and the signal for channel 2 842 is frequency-shifted by B Hz and filtered in band-pass filter 820, leaving the upper and lower side-bands 846, 848 frequency shifted beyond the bandwidth of channel 1. Notably, in the frequency modulated spectrum, by retaining the upper side-band instead of the lower side-band of channel 2 842 on the positive frequency side, and lower side-band instead of upper side-band on the negative frequency side, the read channel analog front end need not have a very sharp roll off. The two channel modulator structure in FIG. 8A can be extended to the case of more than 2 channels to take advantage of the read channel analog front end not requiring sharp roll off. The resulting multi-channel frequency division multiplexing modulator will look similar to that in FIG. 4A except that the frequency shifting signal in k-th frequency shifter will be of the form 2 cos [2π(k−1)Bt] for k=2, 3, . . . , N.

Figure 9:
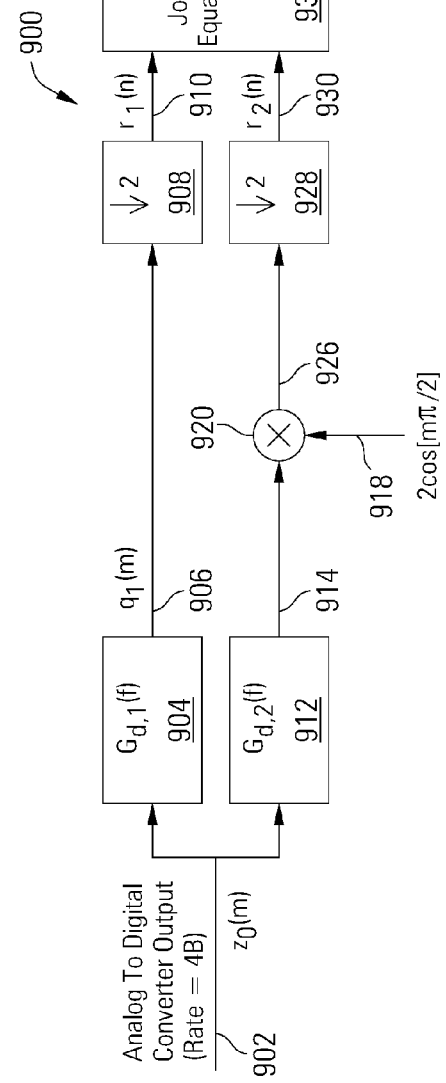
FIG. 9 depicts a two channel digital frequency division multiplexing demodulator in accordance with some embodiments of the present invention.

Turning to FIG. 9, a two channel digital frequency division multiplexing demodulator 900 is depicted in accordance with some embodiments of the present invention. A digital signal 902 $z_0(m)$ carrying two channels in frequency division multiplexed format, derived or received from an analog to digital converter, is received to be demodulated by digital frequency division multiplexing demodulator 900. The digital signal 902 has a rate of 4B samples/sec. To extract the reference channel, the digital signal 902 is provided to a low pass filter 904, filtering out the frequency shifted side-band of channel 2 and yielding digital signal 906 $q_1(m)$ for the reference channel, still having a rate of 4B samples/sec. The low pass filter 904 is a digital low pass filter of bandwidth B Hz. The low pass filter 904 may be any circuit known in the art that is capable of filtering a digital signal to substantially leave only the reference channel. Based upon the disclosure provided herein, one of ordinary skill in the art will recognize a variety of low pass filter circuits that may be used in relation to different embodiments of the present invention. The digital signal 906 is passed through a down-sampler 908 or decimator which decimates or down-samples the digital signal 906, yielding digital signal 910 $r_1(n)$ for the reference channel at a rate of 2B samples/sec.

To extract channel 2, the digital signal 902 is filtered in bandpass filter $G_{d,2}(f)$ 912 that has unit-gain in the frequency band B<=|f|<=2B and zero-gain outside this band, thus yielding filtered digital signal 914. Channel 2 is shifted back to baseband by multiplying digital signal 914 by frequency shifting signal 918 in multiplier 920. In some embodiments, frequency shifting signal 918 is a digital signal represented by 2 cos [mπ/2]. The multiplier 920 yields a frequency shifted digital signal 926 $q_2(m)$ having data rate 4B samples/sec, which is channel 2 shifted back to the center frequency zero. The digital signal 926 is passed through a down-sampler 928 or decimator which decimates or down-samples the digital signal 926, yielding digital signal 930 $r_2(n)$ for channel 2 at a rate of 2B samples/sec.

The two digital signals 910, 930 $r_1(n)$, $r_2(n)$ are provided to a joint equalizer 932 which applies digital finite impulse response filtering to the digital signals 910, 930 to yield equalized data samples 934 for the data track. The equalized data samples 934 may be subsequently processed in any suitable manner, such as in a Viterbi algorithm detector to identify the values in the equalized data samples 934. In some embodiments, the joint equalizer 932 output consists of two streams of digital samples to facilitate detection of data bits from two tracks on the storage medium. The two channel demodulator structure in FIG. 9 can be extended to the case of more than two channels to take advantage of the read channel analog front end not requiring sharp roll off. The resulting multi-channel frequency division multiplexing demodulator will look similar to that in FIG. 6A except that the frequency shifting signal in the k-th digital frequency shifter will be of the form 2 cos [2π(k−1)m/2N] for k=2, 3, . . . , N.

Figure 10:
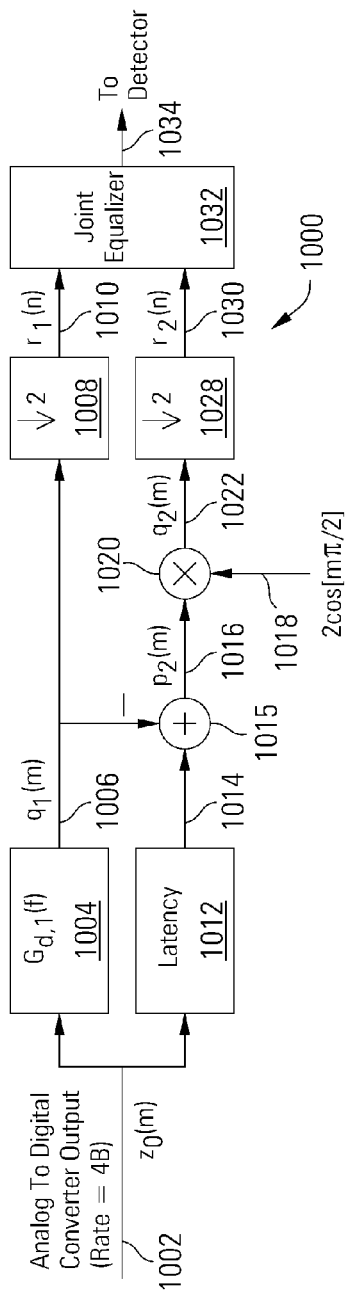
FIG. 10 depicts a two channel digital frequency division multiplexing demodulator in accordance with some embodiments of the present invention.

Turning to FIG. 10, a two channel digital frequency division multiplexing demodulator 1000 is depicted in accordance with some embodiments of the present invention. In the embodiment having an array-reader having only two read sensors, if the low pass filter 1004 is near-ideal in characteristics (i.e. linear phase and flat magnitude response in the frequency band of interest), the demodulator in FIG. 9 can be simplified as shown in the demodulator 1000 of FIG. 10. A digital signal 1002 $z_0(m)$ carrying two channels in frequency division multiplexed format, derived or received from an analog to digital converter, is received to be demodulated by digital frequency division multiplexing demodulator 1000. The digital signal 1002 has a rate of 4B samples/sec. To extract the reference channel, the digital signal 1002 is provided to a low pass filter 1004, filtering out the frequency shifted channel 2 and yielding digital signal 1006 $q_1(m)$ for the reference channel, still having a rate of 4B samples/sec. The low pass filter 1004 is a digital low pass filter of bandwidth B Hz. The low pass filter 1004 may be any circuit known in the art that is capable of filtering a digital signal to substantially leave only the reference channel. Based upon the disclosure provided herein, one of ordinary skill in the art will recognize a variety of low pass filter circuits that may be used in relation to different embodiments of the present invention. The digital signal 1006 is passed through a down-sampler 1008 or decimator which decimates or down-samples the digital signal 1006, yielding digital signal 1010 $r_1(n)$ for the reference channel at a rate of 2B samples/sec.

To extract channel 2, the digital signal 1002 is delayed in delay circuit 1012, matching the delay of low pass filter 1004, so that delayed digital signal 1014 is in sync with digital signal 1006. Channel 1 is subtracted from delayed digital signal 1014 in subtractor 1015, yielding digital signal 1016 $p_2(m)$ containing a frequency shifted channel 2. Channel 2 is shifted back to baseband by multiplying digital signal 1016 by frequency shifting signal 1018 in multiplier 1020. In some embodiments, frequency shifting signal 1018 is a digital signal represented by 2 cos [πm/2]. The multiplier 1020 yields a frequency shifted digital signal 1022 which has been shifted back to the baseband. The frequency shifted digital signal 1022 is passed through a down-sampler 1028 or decimator which decimates or down-samples the frequency shifted digital signal 1022, yielding digital signal 1030 $r_2(n)$ for channel 2 at a rate of 2B samples/sec. The two digital signals 1010, 1030 $r_1(n)$, $r_2(n)$ are provided to a joint equalizer 1032 which applies digital finite impulse response filtering to the digital signals 1010, 1030 to yield equalized data samples 1034 for the data track. The equalized data samples 1034 may be subsequently processed in any suitable manner, such as in a Viterbi algorithm detector to identify the values in the equalized data samples 1034. In some embodiments, the joint equalizer 1032 output consists of two streams of digital samples to facilitate detection of data bits from two tracks on the storage medium.

Figure 11:
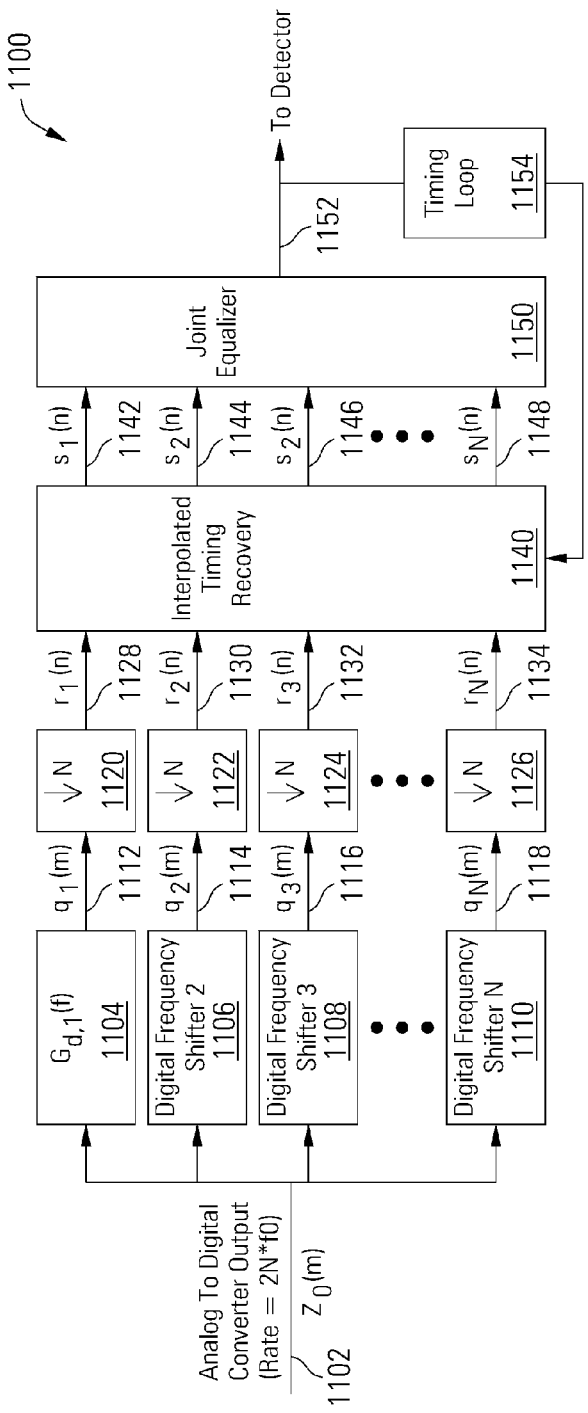
FIG. 11 depicts a digital frequency division multiplexing demodulator with interpolated timing recovery in accordance with some embodiments of the present invention.

Turning to FIG. 11, a digital frequency division multiplexing demodulator with interpolated timing recovery 1100 is depicted in accordance with some embodiments of the present invention. The digital frequency division multiplexing demodulator 1100 can be used in place of the digital frequency division multiplexing demodulator 202 of FIG. 2 in some embodiments. A digital signal 1102 $z_0(m)$ carrying multiple channels in frequency division multiplexed format, derived or received from an analog to digital converter, is received to be demodulated by digital frequency division multiplexing demodulator 1100. The digital signal 1102 has a rate of $2Nf_0$ samples/sec where $f_0$ is chosen to be slightly more than the bandwidth B of a single channel to permit interpolated timing recovery 1140. To extract the reference channel, the digital signal 1102 is provided to a low pass filter 1104, filtering out the frequency shifted side-bands of other channels and yielding digital signal 1112 $q_1(m)$ for the reference channel, still having a rate of $2Nf_0$ samples/sec. The low pass filter 1104 is a digital low pass filter of bandwidth $f_0$ Hz. The low pass filter 1104 may be any circuit known in the art that is capable of filtering a digital signal to substantially leave only the reference channel. Based upon the disclosure provided herein, one of ordinary skill in the art will recognize a variety of low pass filter circuits that may be used in relation to different embodiments of the present invention. The digital signal 1112 is passed through a down-sampler 1120 or decimator which decimates or down-samples the digital signal 1112 at a 1/N rate, yielding digital signal 1128 $r_1(n)$ for the reference channel at a rate of $2f_0$ samples/sec.

To extract channels 2-N other than the reference channel, the digital signal 1102 is provided to digital frequency shifters 1106, 1108, 1110, each adapted to extract a particular one of the channels by band-pass filtering out other channels to leave only the desired channel, and frequency shifting the resulting signal back to the center frequency zero, yielding digital signals 1114, 1116, 1118 $q_2(m), q_3(m), \ldots, q_N(m)$ for the channels other than the reference channel, each still having a rate of $2Nf_0$ samples/sec. The digital signals 1114-1118 are passed through down-samplers 1122, 1124, 1126 which decimate the digital signals 1114-1118 at a 1/N rate, yielding digital signals 1130, 1132, 1134 $r_2(n), r_3(n), \ldots, r_N(n)$ each at a rate of $2f_0$ samples/sec. The down-samplers 1120-1126 may be any circuit known in the art that is capable of sampling a signal or otherwise reducing the data rate of a digital signal. Based upon the disclosure provided herein, one of ordinary skill in the art will recognize a variety of down-sampling circuits that may be used in relation to different embodiments of the present invention.

The N digital signals 1128-1134 are provided to an interpolated timing recovery circuit 1140 which corrects timing errors in digital signals 1128-1134 to yield corrected digital signals 1142, 1144, 1146, 1148. The analog to digital converter that generates digital signal 1102 is not specific to any channel in the upstream analog frequency division multiplexing modulated signal, sampling the combined frequency division multiplexed signal at the rate $2Nf_0$ samples/sec. Different phase or frequency errors may affect each channel. The interpolated timing recovery circuit 1140 maps an error signal from the equalizer output 1152 through a timing loop 1154 to each individual channel by combining the error signal with each of the digital signals 1128-1134. The mapped error signals with appropriate filtering to minimize noise and enhance timing signals are used to interpolate between samples in each of the digital signals 1128-1134 to correct the timing errors, yielding corrected digital signals 1142-1148.

The N digital signals 1142-1148 are provided to a joint equalizer 1150 which applies digital finite impulse response filtering to the digital signals 1142-1148 to yield equalized data samples 1152 for the data track based on the N digital signals 1142-1148. The joint equalizer 1150 thus increases the signal to noise ratio for the data track based on the information in the multiple channels from the array-reader. Based upon the disclosure provided herein, one of ordinary skill in the art will recognize a variety of equalizer circuits that may be used in relation to different embodiments of the present invention. The equalized data samples 1152 may be subsequently processed in any suitable manner, such as in a Viterbi algorithm detector to identify the values in the equalized data samples 1150. The equalized data samples 1152 are also provided to a timing loop circuit 1154 that generates a timing error signal for interpolated timing recovery circuit 1140. The timing error signal may be generated and applied in any suitable manner. Based upon the disclosure provided herein, one of ordinary skill in the art will recognize a variety of timing loop circuits and interpolation circuits that may be used in relation to different embodiments of the present invention.

Figure 12A:
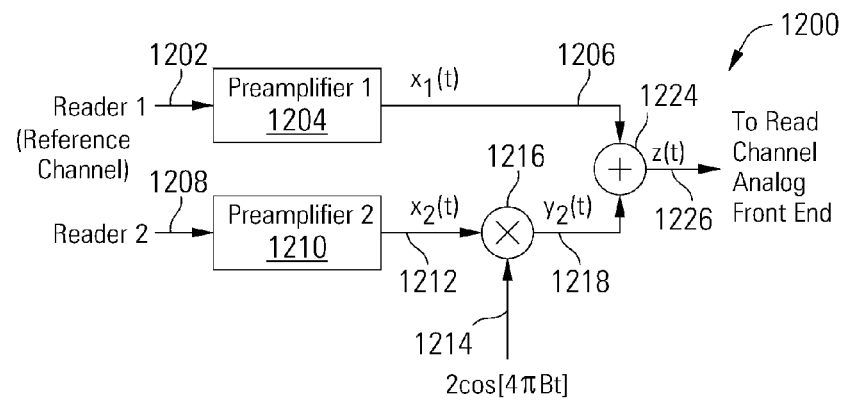
FIG. 12A depicts a two channel frequency division multiplexing modulator in accordance with some embodiments of the present invention.

Turning to FIG. 12A, if the analog front end in the read channel is designed to bandlimit the signal to [−2B, 2B], a two channel frequency division multiplexing modulator can be simplified as shown in the two channel modulator 1200 in accordance with some embodiments of the present invention. An analog signal 1202 for a reference channel is provided to preamplifier 1204, yielding amplified analog signal 1206 $x_1(t)$. An analog signal 1208 for a second channel from an array-reader is provided to preamplifier 1210, yielding amplified analog signal 1212 $x_2(t)$. The amplified analog signal 1212 for the second channel is frequency shifted by multiplying amplified analog signal 1212 by a frequency shifting signal 1214 in multiplier 1216, yielding frequency shifted analog signal 1218. The frequency shifting signal 1214 is in some embodiments a time varying signal represented by 2 cos[4πBt], where B is the bandwidth of a single channel.

The analog signal 1206 $x_1(t)$ and frequency shifted analog signal 1218 $y_2(t)$ are combined in summer 1224, yielding analog frequency division multiplexed modulated signal 1226 $z(t)$. The summer 1224 may be any circuit known in the art or that may be developed in the future that is capable of combining analog signals to produce a single analog output containing information from all the inputs. Based upon the disclosure provided herein, one of ordinary skill in the art will recognize a variety of summer circuits that may be used in relation to different embodiments of the present invention.

Figure 12B:
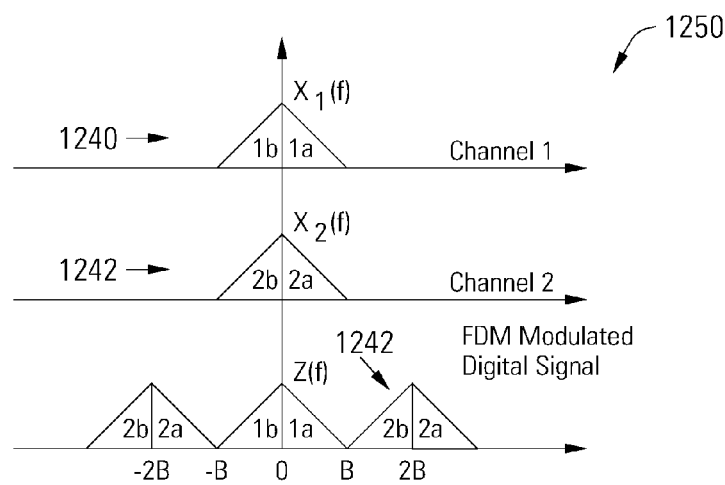
FIG. 12B depicts a frequency domain chart of two reader channels multiplexed by a modulator of FIG. 12A in accordance with some embodiments of the present invention.

Turning to FIG. 12B, a frequency domain chart depicts the spectrum 1250 of two reader channels multiplexed by a modulator 1200 of FIG. 12A in accordance with some embodiments of the present invention. The signal for the reference channel 1 1240 is left at the baseband, and the signal for channel 2 1242 is frequency shifted beyond the bandwidth of channel 1. Notably, both side-bands of channel 2 1242 are shifted and retained in the modulated signal. However, the flex cables do not need to have a wide enough bandwidth to accommodate signals beyond the [−2B, 2B] band, and the analog front end in the read channel can be adapted to band-limit the analog front end output signal to [−2B, 2B].

Figure 13:
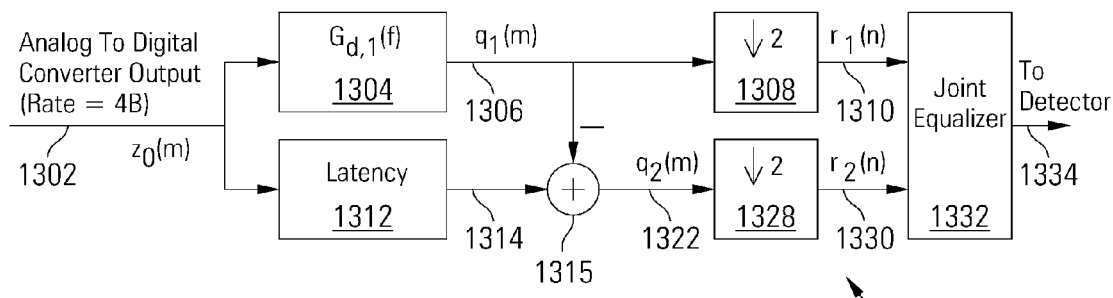
FIG. 13 depicts a two channel digital frequency division multiplexing demodulator suitable for use with the modulator of FIG. 12A in accordance with some embodiments of the present invention.

Turning to FIG. 13, a two channel digital frequency division multiplexing demodulator 1300 suitable for use with the modulator of FIG. 12A is depicted in accordance with some embodiments of the present invention. In the embodiment having an array-reader having only two read sensors, if the analog front end in the read channel is adapted to band-limit the analog front end output signal to [−2B, 2B], and if the low pass filter $G_{d,1}(f)$ 1304 has near-ideal characteristics (i.e., linear phase and flat magnitude response), the simplified demodulator 1300 of FIG. 13 can be used. A digital signal 1302 $z_0(m)$ carrying two channels in frequency division multiplexed format, derived or received from an analog to digital converter, is received to be demodulated by digital frequency division multiplexing demodulator 1300. The digital signal 1302 has a rate of 4B samples/sec. To extract the reference channel, the digital signal 1302 is provided to a low pass filter 1304, filtering out the frequency shifted channel 2 and yielding digital signal 1306 $q_1(m)$ for the reference channel, still having a rate of 4B samples/sec. The low pass filter 1304 is a digital low pass filter of bandwidth B Hz. The low pass filter 1304 may be any circuit known in the art that is capable of filtering a digital signal to substantially leave only the reference channel. Based upon the disclosure provided herein, one of ordinary skill in the art will recognize a variety of low pass filter circuits that may be used in relation to different embodiments of the present invention. The digital signal 1306 is passed through a down-sampler 1308 or decimator which decimates or down-samples the digital signal 1306, yielding digital signal 1310 $r_1(n)$ for the reference channel at a rate of 2B samples/sec.

To extract channel 2, the digital signal 1302 is delayed in delay circuit 1312, matching the delay of low pass filter 1304, so that delayed digital signal 1314 is in sync with digital signal 1306. Channel 1 is subtracted from delayed digital signal 1314 in subtractor 1315, yielding digital signal 1322 $q_2(m)$. The frequency shifting operation for Channel 2 is a multiplication by the sequence $2*(-1)^m$ and can be dropped in view of the decimation-by-2 circuit 1328 following the subtractor 1315. The decimator 1328 decimates or down-samples the digital signal 1322, yielding digital signal 1330 $r_2(n)$ for channel 2.

The two digital signals 1310, 1330 $r_1(n)$, $r_2(n)$ are provided to a joint equalizer 1332 which applies digital finite impulse response filtering to the digital signals 1310, 1330 to yield equalized data samples 1334. The equalized data samples 1334 may be subsequently processed in any suitable manner, such as in a Viterbi algorithm detector to identify the values in the equalized data samples 1334. In some embodiments, the joint equalizer 1332 output consists of two streams of digital samples to facilitate detection of data bits from two tracks on the storage medium.

Any residual signal that remains outside the band [−2B,2B] can act to cause aliasing in the low frequency region of the recovered signal for channel 2, however, this can be prevented or reduced if the analog front end in the read channel is adapted to band-limit the analog front end output signal to [−2B, 2B].

Figure 14:
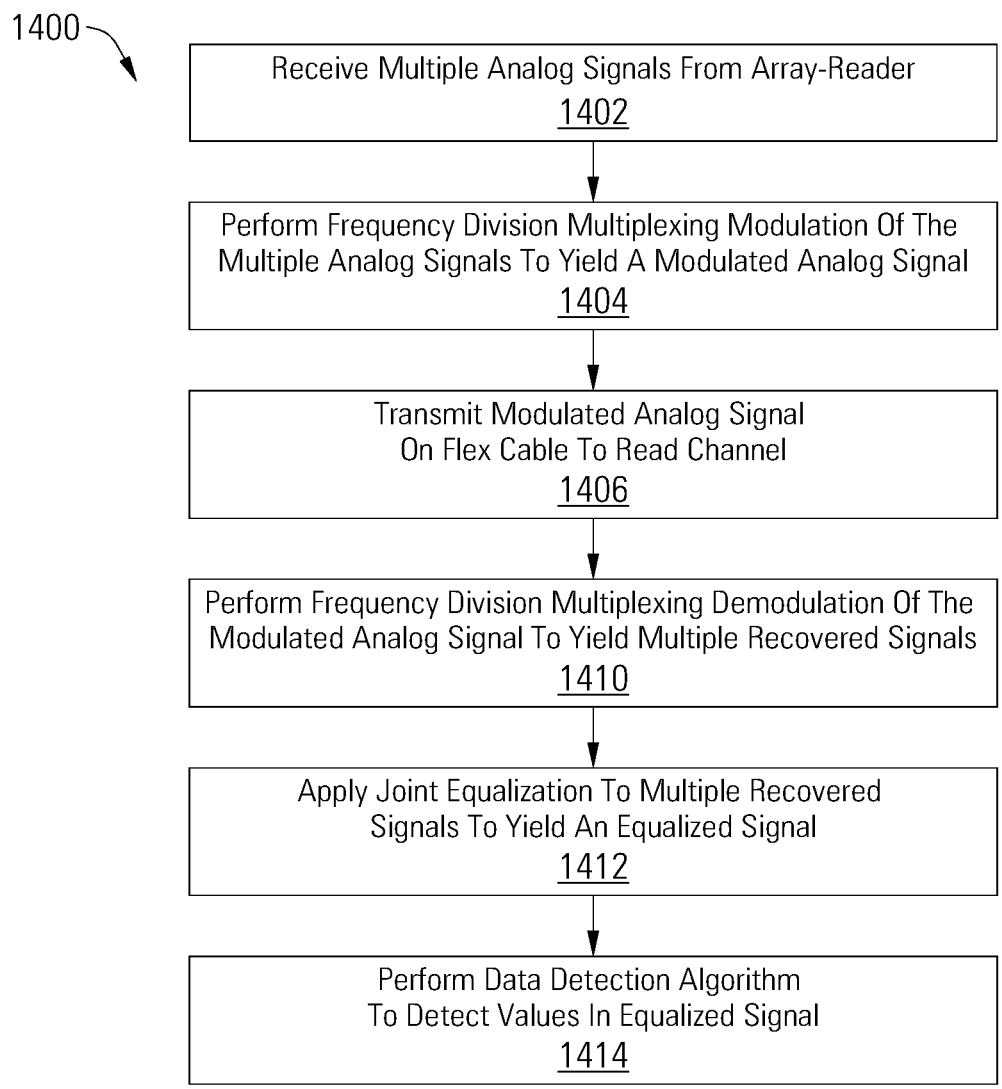
FIG. 14 depicts a flow diagram of an operation to transmit data from an array-reader in a magnetic recording system in accordance with some embodiments of the present invention.

Turning to FIG. 14, a flow diagram 1400 depicts an operation to transmit data from an array-reader in a magnetic recording system in accordance with some embodiments of the present invention. Following flow diagram 1400, multiple analog signals are received from an array-reader (block 1402). The multiple analog signals are frequency division multiplexing modulated to yield a modulated analog signal (block 1404). The modulated analog signal is transmitted on flex cables to a read channel (block 1406). The modulated analog signal is frequency division multiplexing demodulated to yield multiple recovered signals (block 1410). A joint equalization of the multiple recovered signals yields an equalized signal (block 1412). A data detection algorithm is performed on a signal derived from the equalized signal to detect the data bits written on the storage medium (block 1414).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, embodiments of the present invention provide novel systems, devices, methods and arrangements for an array-reader based magnetic recording system with frequency division multiplexing. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. A magnetic recording system comprising:
   an array of analog inputs operable to receive analog signals retrieved from a magnetic storage medium;
   a modulator operable to combine the analog signals to yield a frequency division multiplexed signal;
   a demodulator operable to yield a plurality of demodulated signals from the frequency division multiplexed signal corresponding to each channel of the array; and
   a joint equalizer operable to filter the plurality of demodulated signals to yield an equalized output.

2. The system of claim 1, further comprising a flexible cable operable to transmit the frequency division multiplexed signal.

3. The system of claim 1, wherein the modulator comprises:
   at least one frequency shifter operable to shift all but one of the analog signals to yield at least one frequency shifted signal;
   at least one single sideband chopper operable to filter out a sideband of the at least one frequency shifted signal to yield at least one frequency shifted chopped analog signal; and
   a summer circuit operable to combine said one of the analog signals with the at least one frequency shifted chopped analog signal to yield the frequency division multiplexed signal.

4. The system of claim 3, wherein the at least one single sideband chopper is operable to filter out an upper sideband of the at least one frequency shifted signal, and a lower sideband of the at least one frequency shifted signal.

5. The system of claim 3, wherein the at least one frequency shifter is operable to shift said all but one of the analog signals by an integer multiple of a bandwidth of each of the analog signals.

6. The system of claim 1, wherein the demodulator comprises a digital demodulator, the system further comprising an analog front end operable to amplify the frequency division multiplexed signal, and an analog to digital converter operable to sample a signal at an output of the analog front end to yield a digital modulated signal at an input to the demodulator, wherein a sampling rate of the analog to digital converter is twice a data rate of each channel in the array times a number of channels in the array.

7. The system of claim 1, further comprising an analog to digital converter operable to sample the frequency division multiplexed signal to provide a digital input to the demodulator, wherein the demodulator comprises:
   a digital low pass filter operable to filter the digital input to isolate a reference channel at a baseband frequency in the digital input;
   at least one frequency shifter operable to shift all channels but the reference channel in the digital input back to a baseband frequency to yield at least one frequency shifted channel;
   a plurality of decimators operable to down-sample the reference channel and the at least one frequency shifted channel to yield the plurality of demodulated signals.

8. The system of claim 7, wherein sample rates at inputs to the plurality of decimators are twice a data rate of each channel in the array times a number of channels in the array, and wherein sample rates at outputs from the plurality of decimators are at the data rate of each channel in the array.

9. The system of claim 7, wherein the at least one frequency shifter comprises a band-pass filter operable to isolate a channel associated with the at least one frequency shifter.

10. The system of claim 7, wherein a sampling rate of the plurality of analog to digital converters is equal to a data rate of each channel in the array.

11. The system of claim 7, wherein the at least one frequency shifter comprises an analog band-pass filter operable to isolate a channel associated with the at least one frequency shifter.

12. The system of claim 1, wherein the demodulator comprises an analog demodulator, the system further comprising an analog front end operable to amplify the frequency division multiplexed signal at an input to the demodulator, and a plurality of analog to digital converters each operable to sample one of the plurality of demodulated signals to yield a plurality of digital demodulated signals at inputs of the joint equalizer, wherein a sampling rate of each of the plurality of analog to digital converters is equal to a data rate of each channel in the array.

13. The system of claim 1, wherein the demodulator comprises:
  an analog low pass filter operable to filter an analog input to the demodulator to isolate a reference channel at a baseband frequency in the analog input;
  at least one frequency shifter operable to shift all channels but the reference channel in the analog input back to a baseband frequency to yield at least one frequency shifted channel;
  a plurality of analog to digital converters operable to sample the reference channel and the at least one frequency shifted channel to yield the plurality of demodulated signals.

14. The system of claim 1, wherein the array of analog inputs comprises two analog inputs receiving a reference analog signal and a non-reference analog signal, and wherein the modulator comprises:
  a frequency shifter operable to shift the non-reference analog signal to yield a frequency shifted signal;
  a band-pass filter operable to pass an upper side-band of the non-reference analog signal in the frequency shifted signal to yield a filtered non-reference analog signal; and
  a summer circuit operable to combine the reference analog signal and the filtered non-reference analog signal to yield the frequency division multiplexed signal.

15. The system of claim 1, wherein the array of analog inputs comprises two analog inputs receiving a reference analog signal and a non-reference analog signal, the system further comprising an analog to digital converter operable to sample the frequency division multiplexed signal to provide a digital input to the demodulator, wherein the demodulator comprises:
  a digital low pass filter operable to filter the digital input to isolate a reference channel at a baseband frequency in the digital input;
  a delay circuit operable to delay the digital input to yield a delayed digital input in sync with the reference channel;
  a subtractor operable to subtract the reference channel from the delayed digital input to yield a non-reference channel;
  a frequency shifter operable to shift the non-reference channel to the baseband frequency;
  a band-pass filter operable to filter the non-reference channel; and
  a pair of decimators operable to down-sample the reference channel and the non-reference channel to yield the plurality of demodulated signals.

16. The system of claim 1, wherein the frequency division multiplexed signal comprises a reference channel and a non-reference channel, the system further comprising an analog to digital converter operable to sample the frequency division multiplexed signal to provide a digital input to the demodulator, wherein the demodulator comprises:
  a digital low pass filter operable to filter the digital input to isolate a reference channel at a baseband frequency in the digital input;
  a delay circuit operable to delay the digital input to yield a delayed digital input in sync with the reference channel;
  a subtractor operable to subtract the reference channel from the delayed digital input to yield a non-reference channel;
  a frequency shifter operable to shift the non-reference channel to the baseband frequency; and
  a pair of decimators operable to down-sample the reference channel and the non-reference channel to yield the plurality of demodulated signals.

17. The system of claim 1, wherein the frequency division multiplexed signal comprises a reference channel and a non-reference channel, the system further comprising an analog to digital converter operable to sample the frequency division multiplexed signal to provide a digital input to the demodulator, wherein the demodulator comprises:
  a digital low pass filter operable to filter the digital input to isolate a reference channel at a baseband frequency in the digital input;
  a delay circuit operable to delay the digital input to yield a delayed digital input in sync with the reference channel;
  a subtractor operable to subtract the reference channel from the delayed digital input to yield a non-reference channel; and
  a pair of decimators operable to down-sample the reference channel and the non-reference channel to yield the plurality of demodulated signals.

18. The system of claim 1, further comprising an interpolated timing recovery circuit operable to correct timing errors in the plurality of demodulated signals.

19. A method of connecting an array-reader head assembly in a magnetic storage system to a read channel in the magnetic storage system, comprising:
  providing a modulator in the array-reader head assembly operable to yield a frequency division multiplexed signal containing an array of analog signals from the array-reader head assembly;
  connecting the modulator in the array-reader head assembly to the read channel by a flexible cable pair;
  providing a demodulator in the read channel operable to yield a plurality of demodulated signals from the frequency division multiplexed signal corresponding to each element of the array; and
  providing a joint equalizer in the read channel operable to filter the plurality of demodulated signals to yield an equalized output.

20. A storage system comprising:
  a storage medium;
  an array-reader head assembly disposed in relation to the storage medium and operable to provide an array of analog signals corresponding to information on the storage medium;
  a modulator operable to combine the array of analog signals to yield a frequency division multiplexed signal; and a flexible cable operable to carry the frequency division multiplexed signal from the array-reader head assembly to a read channel circuit, the read channel circuit comprising:

a demodulator operable to yield a plurality of demodulated signals from the frequency division multiplexed signal corresponding to each channel of the array; and a joint equalizer operable to filter the plurality of demodulated signals to yield an equalized output.

* * * * *